United States Patent
Nakao

(10) Patent No.: US 10,681,238 B2
(45) Date of Patent: Jun. 9, 2020

(54) IMAGE FORMING APPARATUS

(71) Applicant: Konica Minolta, Inc., Tokyo (JP)

(72) Inventor: Takehisa Nakao, Aichi (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 16/425,097

(22) Filed: May 29, 2019

(65) Prior Publication Data

US 2019/0394349 A1 Dec. 26, 2019

(30) Foreign Application Priority Data

Jun. 26, 2018 (JP) ................. 2018-120760

(51) Int. Cl.
- *H04N 1/04* (2006.01)
- *H04N 1/00* (2006.01)
- *H04N 1/028* (2006.01)

(52) U.S. Cl.
CPC ..... *H04N 1/00997* (2013.01); *H04N 1/00323* (2013.01); *H04N 1/00933* (2013.01); *H04N 1/02815* (2013.01); *H04N 2201/0094* (2013.01)

(58) Field of Classification Search
CPC .......... H04N 1/00997; H04N 1/00323; H04N 1/00933; H04N 1/02815; H04N 2201/0094
USPC ................. 358/488, 486, 497, 474
See application file for complete search history.

(56) References Cited

U.S. PATENT DOCUMENTS

| | | | | |
|---|---|---|---|---|
| 5,218,408 A | * | 6/1993 | Inada | G03G 15/605 355/75 |
| 5,703,368 A | * | 12/1997 | Tomooka | G08B 13/19 250/349 |
| 5,763,837 A | * | 6/1998 | Davignon | G01G 19/50 128/921 |
| 7,471,424 B2 | * | 12/2008 | Ishido | H04N 1/00551 358/449 |
| 8,248,670 B2 | * | 8/2012 | Shinkawa | H04N 1/0071 358/449 |
| 2005/0052681 A1 | * | 3/2005 | Kogi | H04N 1/00323 358/1.14 |
| 2006/0208157 A1 | * | 9/2006 | Michiie | H04N 1/00689 250/208.1 |
| 2009/0244649 A1 | * | 10/2009 | Shinkawa | H04N 1/0071 358/474 |
| 2009/0323135 A1 | * | 12/2009 | Shinkawa | H04N 1/00795 358/474 |
| 2011/0043874 A1 | * | 2/2011 | Saika | H04N 1/0071 358/475 |
| 2013/0044334 A1 | * | 2/2013 | Igawa | G03G 15/607 356/635 |

(Continued)

FOREIGN PATENT DOCUMENTS

| | | |
|---|---|---|
| JP | 2010130631 A | 6/2010 |
| JP | 2012015750 A | 1/2012 |

(Continued)

*Primary Examiner* — Cheukfan Lee
(74) *Attorney, Agent, or Firm* — Osha Liang LLP

(57) ABSTRACT

An image forming apparatus includes: a light source that irradiates a document with light; a hardware processor that controls lighting of the light source; a cover that is opened and closed with respect to a document platen on which a document is placed; and a detector that detects a person. When the detector detects a person and when an open angle of the cover is a predetermined angle or less, the hardware processor turns on the light source.

9 Claims, 22 Drawing Sheets

(56) References Cited

U.S. PATENT DOCUMENTS

| | | | |
|---|---|---|---|
| 2013/0044357 A1* | 2/2013 | Igawa | H04N 1/0071 358/474 |
| 2015/0234474 A1* | 8/2015 | Yokoyama | G06F 1/26 713/323 |
| 2015/0248156 A1* | 9/2015 | Haraguchi | G03G 15/5016 713/323 |
| 2016/0142576 A1* | 5/2016 | Yamaguchi | H04N 1/00891 358/1.13 |
| 2016/0182756 A1* | 6/2016 | Akiyama | H04N 1/00896 358/1.13 |
| 2017/0039010 A1* | 2/2017 | Nobutani | G06F 3/1222 |
| 2017/0041503 A1* | 2/2017 | Nobutani | H04N 1/442 |
| 2018/0332183 A1* | 11/2018 | Seki | H04N 1/00997 |

FOREIGN PATENT DOCUMENTS

| | | | |
|---|---|---|---|
| JP | 2012104877 A | 5/2012 | |
| JP | 2012104880 A | 5/2012 | |

* cited by examiner

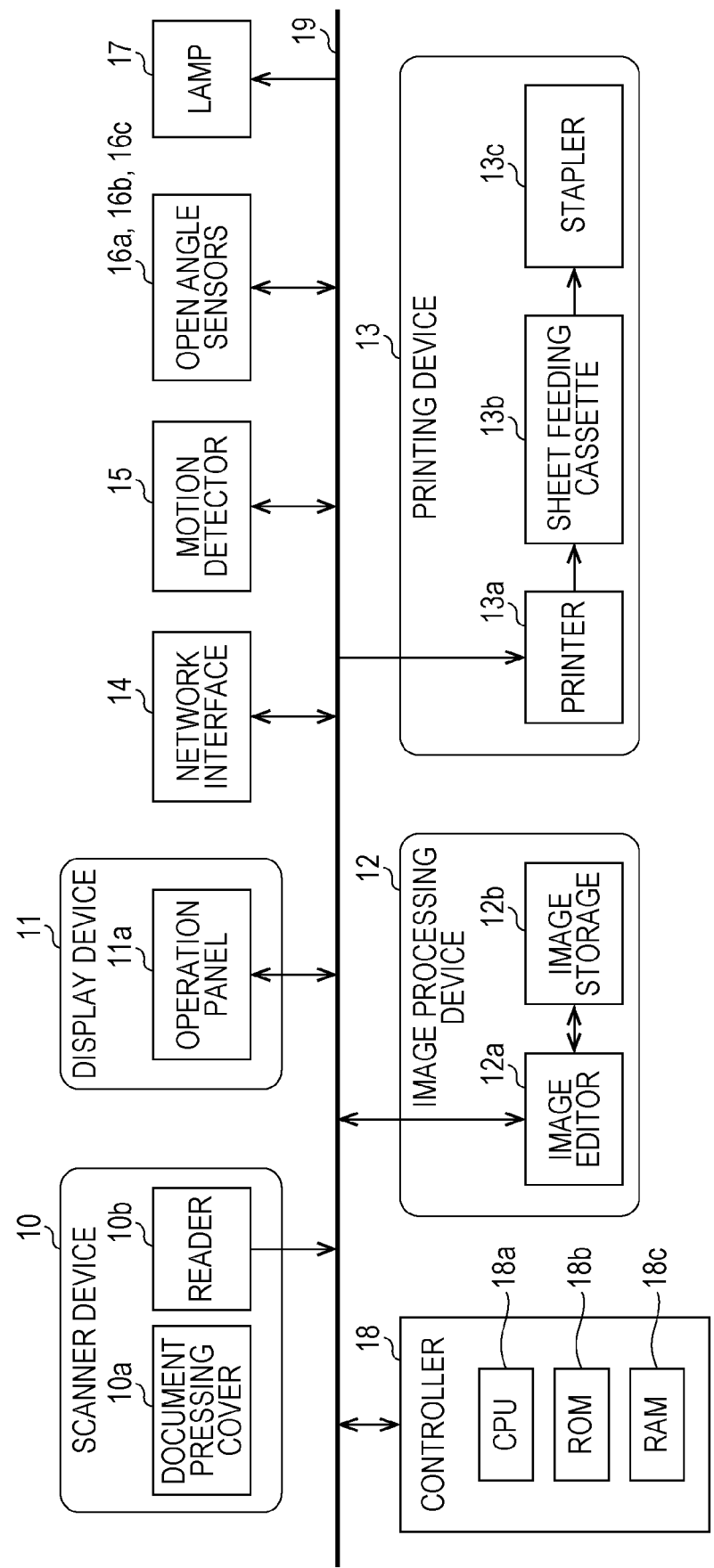

FIG. 6

| OPEN ANGLE (x DEG.) | DISTANCE BETWEEN USER AND IMAGE FORMING APPARATUS (y cm) | | | | | | | | | |
|---|---|---|---|---|---|---|---|---|---|---|
| | 100≥y>90 | 90≥y>80 | 80≥y>70 | 70≥y>60 | 60≥y>50 | 50≥y>40 | 40≥y>30 | 30≥y≥0 | | |
| 0≤x≤4 | ON | ON | ON | ON | ON | ON | ON | ON | | |
| 4<x≤8 | OFF | ON | ON | ON | ON | ON | ON | ON | | |
| 8<x≤12 | OFF | ON | ON | ON | ON | ON | ON | ON | | |
| 12<x≤16 | OFF | OFF | ON | ON | ON | ON | ON | ON | | |
| 16<x≤20 | OFF | OFF | OFF | OFF | ON | ON | ON | ON | | |
| 20<x | OFF | OFF | OFF | OFF | OFF | ON | ON | ON | | |

FIG. 10A

| OPEN ANGLE (x DEG.) | DISTANCE BETWEEN USER AND IMAGE FORMING APPARATUS (y cm) | | | | | | | | | |
|---|---|---|---|---|---|---|---|---|---|---|
| | 100≥y>90 | 90≥y>80 | 80≥y>70 | 70≥y>60 | 60≥y>50 | 50≥y>40 | 40≥y>30 | 30≥y≥0 | | |
| 0≤x≤4 | ON | ON | ON | ON | ON | ON | ON | ON | | |
| 4<x≤8 | OFF | ON | ON | ON | ON | ON | ON | ON | | |
| 8<x≤12 | OFF | OFF | ON | ON | ON | ON | ON | ON | | |
| 12<x≤16 | OFF | OFF | OFF | ON | ON | ON | ON | ON | | |
| 16<x≤20 | OFF | OFF | OFF | OFF | ON | ON | ON | ON | | |
| 20<x | OFF | OFF | OFF | OFF | OFF | ON | ON | ON | | |

FIG. 10B

| OPEN ANGLE (x DEG.) | DISTANCE BETWEEN USER AND IMAGE FORMING APPARATUS (y cm) | | | | | | | | | |
|---|---|---|---|---|---|---|---|---|---|---|
| | 100≥y>90 | 90≥y>80 | 80≥y>70 | 70≥y>60 | 60≥y>50 | 50≥y>40 | 40≥y>30 | 30≥y≥0 | | |
| 0≤x≤4 | ON | ON | ON | ON | ON | ON | ON | ON | | |
| 4<x≤8 | ON | ON | ON | ON | ON | ON | ON | ON | | |
| 8<x≤12 | OFF | ON | ON | ON | ON | ON | ON | ON | | |
| 12<x≤16 | OFF | OFF | ON | ON | ON | ON | ON | ON | | |
| 16<x≤20 | OFF | OFF | OFF | ON | ON | ON | ON | ON | | |
| 20<x | OFF | OFF | OFF | OFF | OFF | ON | ON | ON | | |

FIG. 14A

| OPEN ANGLE (x DEG.) | DISTANCE BETWEEN USER AND IMAGE FORMING APPARATUS (y cm) | | | | | | | | | | |
|---|---|---|---|---|---|---|---|---|---|---|---|
| | 100≥y>90 | 90≥y>80 | 80≥y>70 | 70≥y>60 | 60≥y>50 | 50≥y>40 | 40≥y>30 | 30≥y≥0 |
| 0≤x≤4 | ON | ON | ON | ON | ON | ON | ON | ON |
| 4<x≤8 | OFF | ON | ON | ON | ON | ON | ON | ON |
| 8<x≤12 | OFF | OFF | ON | ON | ON | ON | ON | ON |
| 12<x≤16 | OFF | OFF | OFF | OFF | ON | ON | ON | ON |
| 16<x≤20 | OFF | OFF | OFF | OFF | OFF | ON | ON | ON |
| 20<x | OFF | OFF | OFF | OFF | OFF | OFF | ON | ON |

FIG. 14B

| OPEN ANGLE (x DEG.) | DISTANCE BETWEEN USER AND IMAGE FORMING APPARATUS (y cm) | | | | | | | | | | |
|---|---|---|---|---|---|---|---|---|---|---|---|
| | 100≥y>90 | 90≥y>80 | 80≥y>70 | 70≥y>60 | 60≥y>50 | 50≥y>40 | 40≥y>30 | 30≥y≥0 |
| 0≤x≤4 | ON | ON | ON | ON | ON | ON | ON | ON |
| 4<x≤8 | ON | ON | ON | ON | ON | ON | ON | ON |
| 8<x≤12 | OFF | ON | ON | ON | ON | ON | ON | ON |
| 12<x≤16 | OFF | OFF | OFF | ON | ON | ON | ON | ON |
| 16<x≤20 | OFF | OFF | OFF | OFF | ON | ON | ON | ON |
| 20<x | OFF | OFF | OFF | OFF | OFF | ON | ON | ON |

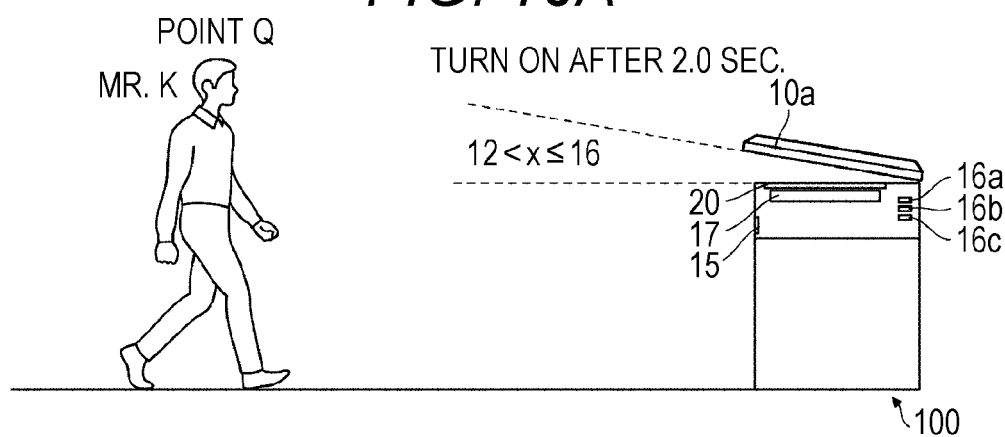
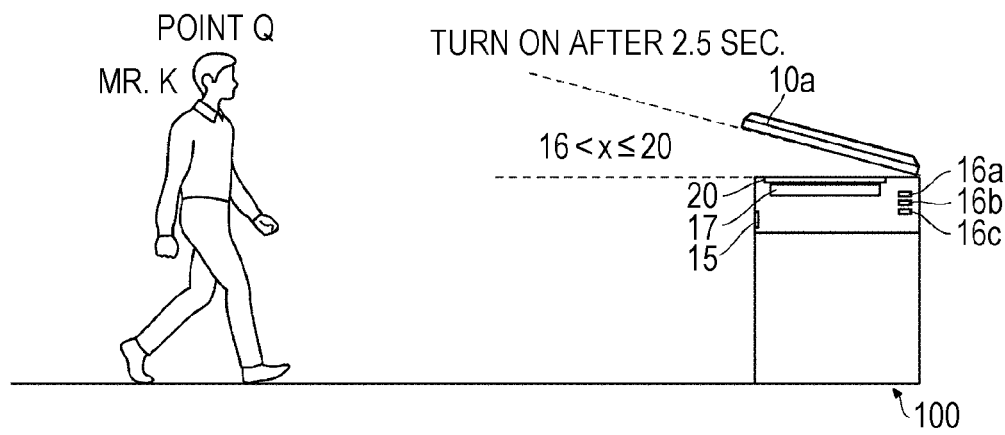

FIG. 17

|  |  | PERIOD |
|---|---|---|
| OPEN ANGLE (x DEG.) | 0≤x≤4 | 0 SEC. |
| | 4<x≤8 | 1.0 SEC. |
| | 8<x≤12 | 1.5 SEC. |
| | 12<x≤16 | 2.0 SEC. |
| | 16<x≤20 | 2.5 SEC. |
| | 20<x | 3.0 SEC. |

FIG. 20

|  |  | AREA | | |
|---|---|---|---|---|
|  |  | AREA 1 | AREA 2 | AREA 3 |
| OPEN ANGLE (x DEG.) | $0 \leq x \leq 4$ | ON | ON | ON |
|  | $4 < x \leq 8$ | ON | ON | ON |
|  | $8 < x \leq 12$ | ON | ON | ON |
|  | $12 < x \leq 16$ | ON | ON | OFF |
|  | $16 < x \leq 20$ | ON | OFF | OFF |
|  | $20 < x$ | OFF | OFF | OFF |

# IMAGE FORMING APPARATUS

CROSS-REFERENCE TO RELATED APPLICATION

The entire disclosure of Japanese patent Application No. 2018-120760, filed on Jun. 26, 2018, is incorporated herein by reference.

BACKGROUND

Technical Field

The present invention relates to an image forming apparatus.

Description of the Related Art

There is a conventionally-known image forming apparatus having functions: to shift a mode from a normal mode to a power saving mode to restrain energization to a scanner device in a case where the image forming apparatus is not used by a user for a certain period; and to return the mode to the normal mode when the use of the image forming apparatus is started again. In this case, when the mode is returned to the normal mode, it is necessary to perform initialization processing for the scanner device, and the user cannot use the scanner device and needs to wait until the initialization processing is completed.

In the initialization processing, it takes a certain period to return the mode from the power saving mode to the normal mode because of the following processing: turn on a light source in order to irradiate a document with light; irradiate a white reference plate with light; read the light reflected by the white reference plate and generate shading correction data; and correct gain of output of a reading sensor based on the light reflected from the same white reference plate (gain adjustment).

Accordingly, in recent years, to shorten such a user's waiting time caused by returning the mode from the power saving mode to the normal mode, a motion detector is mounted on the image forming apparatus, and control is performed to start the initialization processing when the motion detector detects the user approaching the image forming apparatus.

However, in this control, a light source is turned on when the motion detector detects the user approaching the image forming apparatus. Therefore, in a case where a document pressing cover, an automatic document feeder, or the like is open, the user may feel dazzled because the light of the light source enters eyes of the user.

The user may feel dazzled by the light of the light source during and even after the initialization processing. For example, a similar matter may occur at the time of document size detection during which the light source is required to be turned on, and a plurality of methods has been proposed as below for dealing with this matter.

JP 2012-104880 A and JP 2012-104877 A disclose methods in which all or a part of light emitting elements or light emitting element blocks are/is emitted at the time of document size detection with a predetermined light emission amount that is less than a light emission amount at the time of document reading.

JP 2012-15750 A discloses a method in which light is simultaneously emitted from three-color LEDs at the time of document reading, whereas the light is sequentially emitted from the three-color LEDs at the time of document size detection to reduce a light amount that is less than a light amount at the time of the simultaneous light emission.

JP 2010-130631 A discloses a method in which an LED light amount is adjusted at the time of document size detection in accordance with an open angle of a pressure plate that presses a document.

To summarize the above methods, in the methods disclosed in JP 2012-104880 A, JP 2012-104877 A, JP 2012-15750 A, and JP 2010-130631 A, the light source is turned on at the time of document size detection with the light amount less than the light amount at the time of document reading in order to mitigate dazzling by the light.

However, in initialization processing, it is necessary to turn on a light source with a considerable light amount in order to properly correct data of a document set after completion of the initialization processing. Therefore, in a case where utilization of an apparatus is prepared by turning on a light source in response to detection of a user, it is not possible to apply above-described technologies in the related art in which a light amount of the light source is reduced in order to mitigate dazzling by light.

SUMMARY

Accordingly, one or more embodiments of the present invention provide an image forming apparatus capable of preventing a user from feeling dazzled as much as possible while utilization of the apparatus can be prepared by turning on a light source in response to detection of the user.

An image forming apparatus of one or more embodiments of the present invention comprises: a light source to irradiate a document with light; a hardware processor that controls lighting of the light source; an openable/closable member provided in a manner freely opened and closed with respect to a document platen provided to place a document; and a detector that detects a person, wherein in a case where the detector detects a person, the hardware processor turns on the light source when an open angle of the openable/closable member is a predetermined angle or less.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 2 is a block diagram illustrating a hardware configuration of the image forming apparatus in one or more embodiments;

FIG. 6 is a diagram illustrating a lamp lighting control table in one or more embodiments;

FIGS. 10A and 10B are diagrams illustrating lamp lighting control tables in one or more embodiments;

FIGS. 14A and 14B are diagrams illustrating lamp lighting control tables in one or more embodiments;

FIGS. 16A and 16B are views illustrating an outline of lamp lighting control in one or more embodiments;

FIG. 17 is a view illustrating a lamp lighting control table in one or more embodiments;

FIG. 20 is a diagram illustrating a lamp lighting control table in one or more embodiments;

DETAILED DESCRIPTION

Figure 1A:
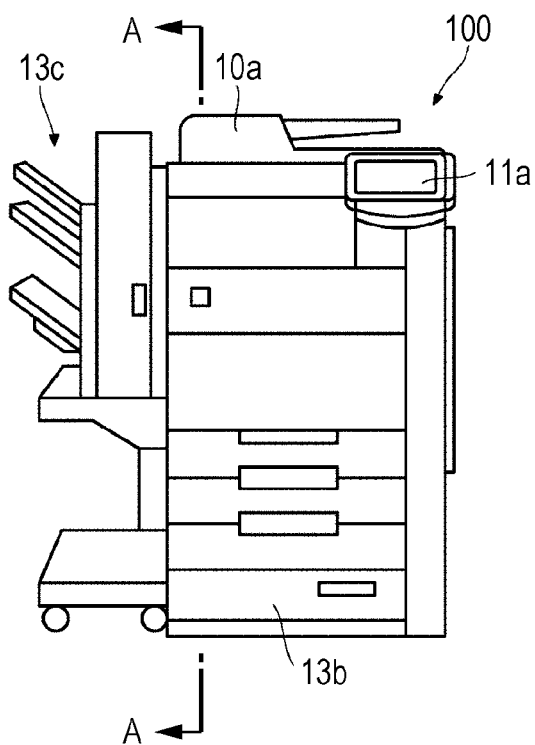
FIGS. 1A and 1B are views illustrating an image forming apparatus according to one or more embodiments.

Hereinafter, embodiments of the present invention will be described with reference to the drawings. However, the scope of the invention is not limited to the disclosed embodiments. Note that, in the drawings, identical or corresponding parts will be denoted by the same reference signs, and descriptions thereof will not be repeated.

First, a configuration of an image forming apparatus 100 according to one or more embodiments will be described. The image forming apparatus 100 includes a scanner device 10 and may be implemented in any form such as a multi-function peripheral (MFP), a copying machine, a facsimile machine, or a printer.

Figure 1B:
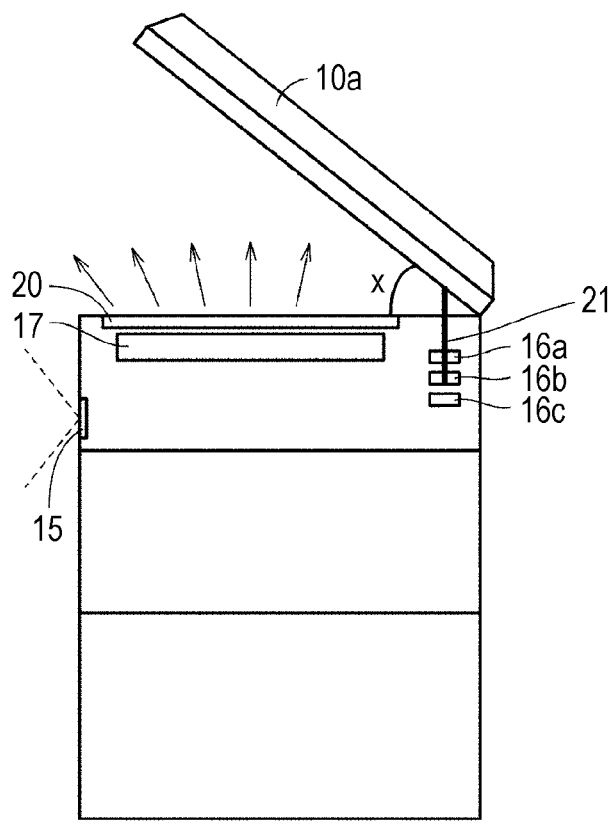

FIGS. 1A and 1B are views each illustrating the image forming apparatus 100 according to one or more embodiments. FIG. 1A is the view illustrating an external appearance of the image forming apparatus 100, and FIG. 1B is a schematic view of a cross sectional view taken along a line A-A. Additionally, FIG. 2 is a block diagram illustrating a hardware configuration of the image forming apparatus 100 in one or more embodiments.

Referring to FIGS. 1A, 1B and 2, the image forming apparatus 100 is a multi-function peripheral here, and includes the scanner device 10, a display device 11, an image processing device 12, a printing device 13, a network interface 14, a motion detector 15, an open angle sensors 16a, 16b, and 16c, a lamp 17, and a controller 18, and the respective components are mutually connected via a bus 19.

The scanner device 10 is provided at an upper part of a main body of the image forming apparatus 100. The scanner device 10 includes a document pressing cover 10a and a reader 10b integrated with an automatic document feeder (see FIGS. 1A and 1B). The scanner device 10 reads an image of a document fed from the automatic document feeder or an image of a document placed on a document platen 20 (see FIG. 1B) by the reader 10b, and transmits read image data to the image processing device 12 and the like.

Here, referring to FIG. 1B, the document pressing cover 10a will be described. The document pressing cover 10a is joined to the main body of the image forming apparatus 100 in a manner freely opened and closed with respect to the document platen 20 on which a document is placed. A rod-shaped detection object 21 is attached to a vicinity of the joined part between the document pressing cover 10a and the main body of image forming apparatus 100 and the document pressing cover 10a side in a state in which a longitudinal direction of the detection object 21 is directed in a vertical direction. The detection object 21 is inserted in a direction vertical to the main body of the image forming apparatus 100 at a depth at which the detection object operates simultaneously with an open angle of the document pressing cover 10a. Note that the document pressing cover 10a is not limited to the one integrated with the automatic document feeder, and only the document pressing cover may be provided.

The display device 11 is provided at the upper part of the main body of the image forming apparatus 100. The display device 11 includes a touch panel type operation panel 11a (see FIG. 1A). The operation panel 11a displays various kinds of information such as an operation screen, and enables touch operation by a user.

The image processing device 12 is provided inside the main body of the image forming apparatus 100. The image processing device 12 includes an image editor 12a and an image storage 12b. The image editor 12a edits data of an image read by the reader 10b based on print settings by a user and the like. The image storage 12b is, for example, a hard disk device and temporarily stores various kinds of information such as data of an image read by the reader 10b and data of the image edited by the image editor 12a.

The printing device 13 includes a printer 13a, a sheet feeding cassette 13b (see FIG. 1A), and a stapler 13c (see FIG. 1A). The printer 13a is provided inside the main body of the image forming apparatus 100, and prints the image edited by the image editor 12a on a sheet stored in the sheet feeding cassette 13b. The stapler 13c is provided on a left side or a right side (left side in FIG. 1A) of the main body of the image forming apparatus 100, and applies post processing such as stapling to a sheet printed by the printer 13a.

The network interface 14 is provided inside the main body of the image forming apparatus 100. The network interface 14 is an interface to connect the image forming apparatus 100 to a network, and is a wired LAN, a wireless LAN, or the like. The network interface 14 is connected to another device and can receive job data for printing from another device or can transmit an image read by the reader 10b to another device.

As illustrated in FIG. 1B, the motion detector 15 is provided on a front surface of the main body of the image forming apparatus 100. The motion detector 15 detects a user who is approaching the image forming apparatus 100.

As illustrated in FIG. 1B, the open angle sensors 16a, 16b, and 16c are provided inside the main body of the image forming apparatus 100 and detect how far the document pressing cover 10a is open from the document platen 20. Specifically, an angle between an upper side of the document platen 20 and a lower side of the document pressing cover 10a (hereinafter referred to as "open angle", and x in FIG. 1B represents the "open angle") is detected. The open angle sensors 16a, 16b, and 16c are aligned in the vertical direction in which the detection object 21 is inserted, and the open angle of the document pressing cover 10a is localized based on detected situations of the detection object 21 by the respective open angle sensors 16a, 16b, and 16c. For example, in a case where the document pressing cover 10a is closed, the open angle is 0 degrees. Note that the larger number of open angle sensors may be provided as far as the sensors can detect the open angle although the image forming apparatus 100 illustrated in FIG. 1B includes the three open angle sensors (the open angle sensors 16a, 16b, and 16c). Alternatively, the open angle may be detected by detecting a position of the detection object 21 localized by a single sensor.

As illustrated in FIG. 1B, the lamp 17 is provided under the document platen 20 and is turned on at the time of document reading, initialization processing for the scanner device, and the like. The lamp 17 may be any light source as far as the lamp is a light source irradiating a document with light, such as an LED, an incandescent lamp, or a fluorescent lamp. When the lamp 17 is turned on in a case where the document pressing cover 10a is open, the light directly enters eyes of a user (arrows illustrated in FIG. 1B), and therefore, the user feels dazzled When the lamp 17 is turned on, light reflected by the document pressing cover 10a and the like are also generated, but note that such light does not cause much of a problem because a light amount thereof is largely reduced due to diffusion, compared to a light amount of the direct light.

The controller 18 is provided inside the main body of the image forming apparatus 100. The controller 18 includes a central processing unit (CPU) 18a, a read only memory (ROM) 18b, a random access memory (RAM) 18c, and the like. The CPU 18a comprehensively controls operation of the respective components of the image forming apparatus 100. The ROM 18b stores a control program to control operation of the image forming apparatus 100. The RAM 18c is a work memory for the CPU 18a.

The image forming apparatus 100 has a power saving function, and in a case of not detecting, for a certain period, user's operation on the image forming apparatus 100, such as opening/closing operation of the document pressing cover 10a or operation on the operation panel 11a, a mode is shifted from a normal mode to a power saving mode in which energization is restrained. When the user is detected by the motion detector 15 after shifting the mode to the power saving mode, the processing to return the mode from the power saving mode to the normal mode is automatically started. The initialization processing for the scanner device 10 is executed at the time of returning the mode from the power saving mode to the normal mode. In the initialization processing, the lamp 17 is turned on to apply adjustment to be ready for the normal mode. Therefore, when the processing to return the mode from the power saving mode to the normal mode is started only on a condition that the user is detected by the motion detector 15 despite a situation that the document pressing cover 10a is wide open, the user may feel dazzled.

Therefore, in one or more embodiments, whether to turn on the lamp 17 in order to return the mode from the power saving mode to the normal mode is determined in accordance with a situation at the time of the motion detector 15 detecting a user. Specifically, the lamp 17 is turned on under a condition that the open angle of the document pressing cover 10a is a predetermined angle or less at the time of the motion detector 15 detecting the user, and then the initialization processing to return the mode from the power saving mode to the normal mode is started. Hereinafter, control to determine whether to turn on the lamp 17 at the time of the motion detector 15 detecting a user will be described in detail with reference to the drawings. Note that such control will be simply referred to as lighting control for the lamp 17 in the following description.

Figure 3:
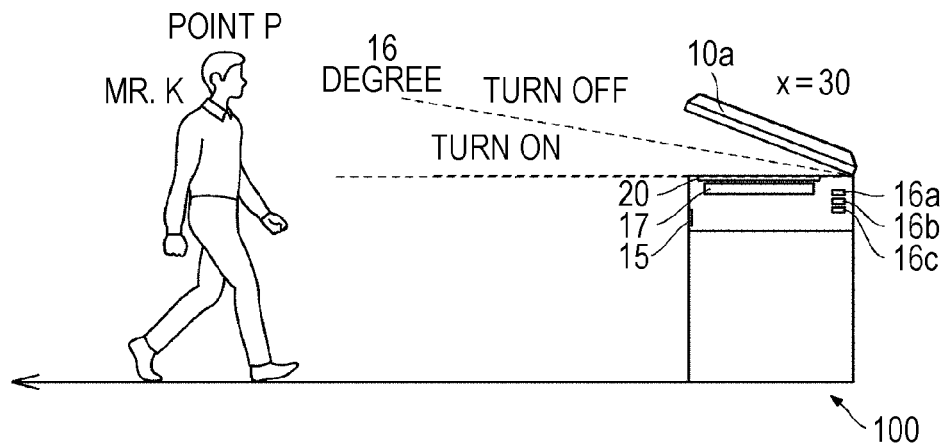
FIG. 3 is a view illustrating an outline of lamp lighting control in one or more embodiments.

First, as one or more embodiments, control to turn on the lamp 17 in accordance with the open angle will be described. FIG. 3 is a diagram illustrating an outline of lamp lighting control in one or more embodiments.

FIG. 3 illustrates a situation in which Mr. K who is a user is walking toward the image forming apparatus 100. A point P represents a point where the motion detector 15 detects Mr. K. "x=30" represents the open angle of the document pressing cover 10a. Additionally, "16 degree" is a threshold value of the open angle of the document pressing cover 10a used to determine whether to turn on the lamp 17. In the example of FIG. 3, since the open angle of the document pressing cover 10a is 30 degrees that is a value corresponding to the threshold value or more, the lamp 17 is not turned on.

As illustrated in FIG. 3, in one or more embodiments, when the open angle of the document pressing cover 10a is 16 degrees or less at the time of the motion detector 15 detecting the user, the lamp 17 is turned on. However, the threshold angle is not limited to 16 degrees. The threshold value may be set to any angle as far as the light of the lamp 17 does not directly enter the eyes of the user, for example. Generally, in a case where the open angle of the document pressing cover 10a is large, the lamp light easily enters the eyes of the user, however; according to the control like one or more embodiments, in a case where the open angle of the document pressing cover 10a exceeds the threshold value at the time of the motion detector 15 detecting the user, the lamp 17 is not turned on. Therefore, the user is free from feeling dazzled. Additionally, according to such control, the lamp 17 is turned on when the open angle of the document pressing cover 10a is the threshold value or less at the time of the motion detector 15 detecting the user, and then the initialization processing to return the mode to the normal mode is automatically started. Therefore, it is possible to shorten a user's waiting time caused by returning the mode from the power saving mode to the normal mode.

Figure 4:
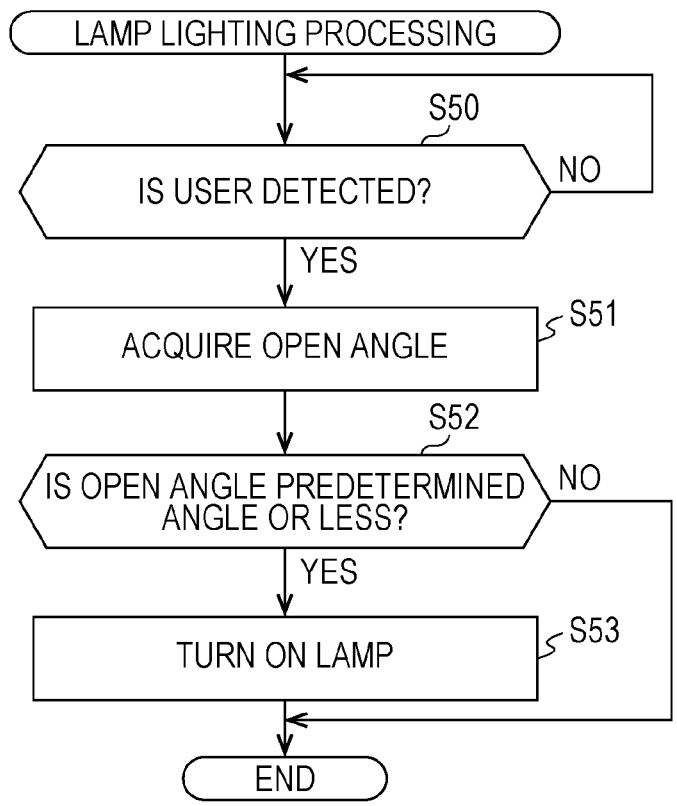
FIG. 4 is a flowchart to describe lamp lighting processing in one or more embodiments.

FIG. 4 is a flowchart to describe lamp lighting processing in one or more embodiments. The processing illustrated in FIG. 4 is executed by the CPU 18a.

First, the CPU 18a determines whether the motion detector 15 has detected a user (S50). The CPU 18a repeats the determination processing in S50 at a certain time interval until it is determined that the motion detector 15 has detected the user, and in a case of determining that the motion detector 15 has detected the user (YES in S50), the CPU 18a advances the processing to S51. For example, in FIG. 3, since the motion detector 15 detects Mr. K at the point P, the CPU 18a determines that the motion detector 15 has detected the user in first-time determination processing thereafter.

In S51, the CPU 18a acquires an open angle of the document pressing cover 10a detected by the open angle sensors 16a, 16b, and 16c. In the case where the motion detector 15 detects the user, the open angle of the document pressing cover 10a is detected by the open angle sensors 16a, 16b, and 16c. When each of the open angle sensors 16a, 16b, and 16c receives a request to acquire the open angle of document pressing cover 10a from the CPU 18a, the open angle of the document pressing cover 10a is transmitted to the CPU 18a. For example, in FIG. 3, the CPU 18a acquires information indicating that the open angle of the document pressing cover 10a is 30 degrees.

Next, the CPU 18*a* determines whether the acquired open angle of the document pressing cover 10*a* is the predetermined angle or less (S52). In a case where the acquired open angle of the document pressing cover 10*a* is the predetermined angle or less (YES in S52), the CPU 18*a* turns on the lamp 17 (S53) and finishes the processing. On the other hand, in a case where the acquired open angle of the document pressing cover 10*a* is not the predetermined angle or less (NO in S52), the CPU 18*a* finishes the processing without turning on the lamp 17. For example, in FIG. 3, the predetermined angle is set to 16 degrees, and since the open angle of the document pressing cover 10*a* exceeds the 16 degrees, the CPU 18*a* finishes the processing without turning on the lamp 17.

With execution of the processing from S50 to S53 by the CPU 18*a*, it is possible to perform the control as illustrated in FIG. 3 to: turn on the lamp 17 under the condition that the open angle of the document pressing cover 10*a* is the predetermined angle or less at the time of the motion detector 15 detecting the user; and start the initialization processing to return the mode from the power saving mode to the normal mode.

One or more embodiments described-below differ from aforementioned embodiments in lighting control for a lamp 17 at the time of a motion detector 15 detecting a user. Additionally, one or more embodiments differ from the aforementioned embodiments in that the motion detector 15 in the aforementioned embodiments merely detects a user who is approaching the image forming apparatus 100, whereas the motion detector 15 in one or more embodiments can detect a distance between a user and the image forming apparatus 100. The remaining aspects of one or more embodiments are in common with the aforementioned embodiments, including a configuration of the image forming apparatus 100. In one or more embodiments, the lamp 17 is turned on under a condition that an open angle of a document pressing cover 10*a* is a predetermined angle or less at the time of the motion detector 15 detecting the user, and then initialization processing to return a mode from a power saving mode to a normal mode is started. On the other hand, in one or more embodiments, in a case where the motion detector 15 detects the user, the lamp 17 is turned on in accordance with the open angle of the document pressing cover 10*a* and the distance between the user and the image forming apparatus 100, and then the initialization processing to return the mode from the power saving mode to the normal mode is started.

Figure 5A:
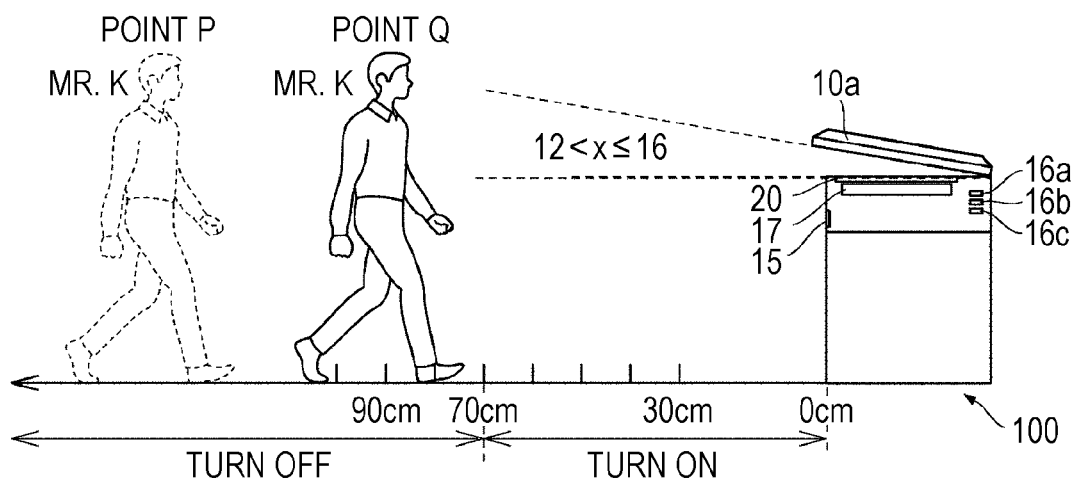
FIGS. 5A and 5B are views illustrating an outline of lamp lighting control in one or more embodiments.
Figure 5B:
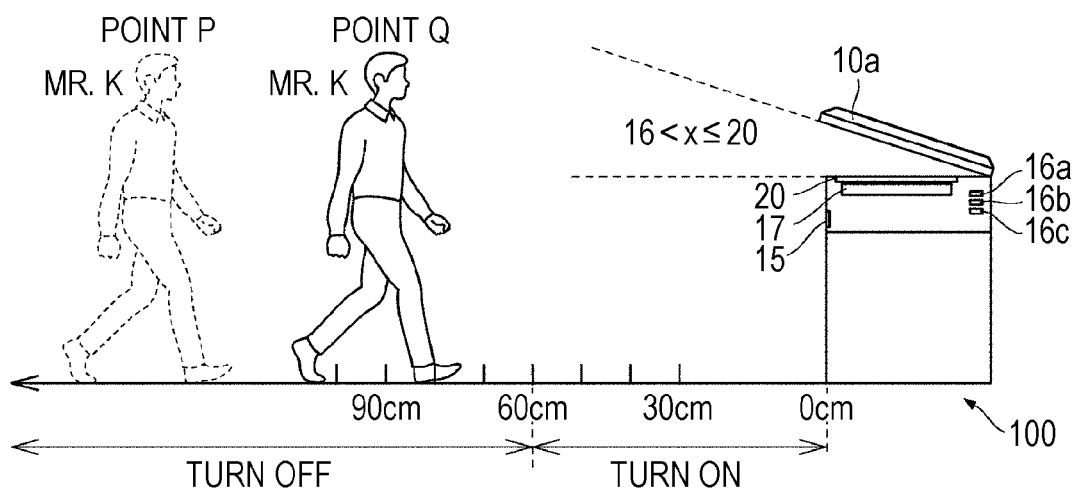

FIGS. 5A and 5B are views illustrating an outline of lamp lighting control in one or more embodiments. FIGS. 5A and 5B illustrate a situation in which Mr. K who is a user is walking toward the image forming apparatus 100. A point P represents a point where the motion detector 15 starts detecting Mr. K, and a point Q represents a current position of Mr. K. As illustrated in FIGS. 5A and 5B, the distance between the point Q and the image forming apparatus 100 is 90 cm. As illustrated in FIG. 5A, in a case where an open angle x of the document pressing cover 10*a* is larger than 12 degrees and is 16 degrees or less, the lamp 17 is turned on when the distance between Mr. K and the image forming apparatus 100 becomes 70 cm or less. On the other hand, as illustrated in FIG. 5B, in a case where the open angle x of the document pressing cover 10*a* is larger than 16 degrees and is 20 degrees or less, the lamp 17 is turned on when the distance between Mr. K and the image forming apparatus 100 becomes 60 cm or less.

As illustrated in FIGS. 5A and 5B, in one or more embodiments, in the case where the motion detector 15 detects the user, when the open angle of the document pressing cover 10*a* is large, the lamp 17 is more controlled not to be turned on until the user approaches the image forming apparatus 100, compared to when the open angle of the document pressing cover 10*a* is small. Generally, in a case where the document pressing cover 10*a* is wide open, lamp light easily enters eyes of the user. Therefore, in such a case, the user feels dazzled when the lamp 17 is kept turned on for a long time. However, according to the control like one or more embodiments, in the case where the motion detector 15 detects the user, when the open angle of the document pressing cover 10*a* is large, the lamp 17 can be turned on more delayed than when the open angle of the document pressing cover 10*a* is small. As a result, in the case where the document pressing cover 10*a* is wide open, the user is free from feeling dazzled because a situation in which the user receives the lamp light for a long time can be avoided. Additionally, according to such control, even in the case where the document pressing cover 10*a* is wide open, the lamp 17 is turned on when the user approaches the image forming apparatus 100, and then the initialization processing to return the mode to the normal mode is automatically started. Therefore, it is possible to shorten a user's waiting time caused by returning the mode from the power saving mode to the normal mode.

Figure 7:
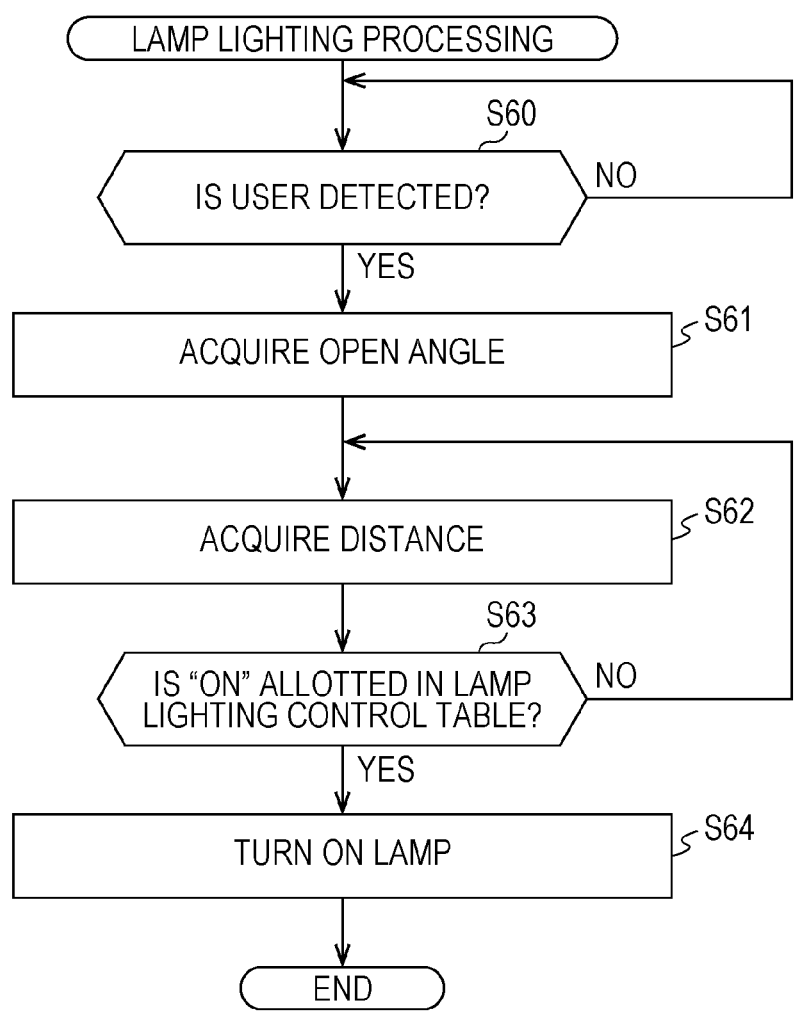
FIG. 7 is a flowchart to describe lamp lighting processing in one or more embodiments.

FIG. 6 is a diagram illustrating a lamp lighting control table 1 according to one or more embodiments. The lamp lighting control table 1 is stored in a ROM 18*b*. In the lamp lighting control table 1, "ON" or "OFF" of the lamp 17 is allotted in accordance with each open angle of the document pressing cover 10*a* and each distance between a user and the image forming apparatus 100. In a case where a relation between the open angle and the distance corresponds to "ON" in the lamp lighting control table 1, the lamp 17 is turned on, and in a case where the relation corresponds to "OFF", the lamp 17 is not turned on. The lamp lighting control illustrated in FIGS. 5A and 5B is achieved by referring to the lamp lighting control table 1 in lamp lighting processing by a CPU 18*a* (FIG. 7).

In the lamp lighting control table 1, in a case where the distance between the user and the image forming apparatus 100 is 50 cm or less, "ON" is allotted regardless of the open angle of the document pressing cover 10*a*. With this allotment, in the case where the motion detector 15 detects a user, when the distance between the user and the image forming apparatus 100 becomes a certain distance or less (for example, 50 cm or less in FIG. 6), the lamp 17 is turned on regardless of the open angle of the document pressing cover 10*a*, and then the initialization processing to return the mode to the normal mode is automatically started. Therefore, it is possible to shorten the user's waiting time caused by returning the mode from the power saving mode to the normal mode.

On the other hand, in the lamp lighting control table 1, in a case where the distance between the user and the image forming apparatus 100 exceeds 50 cm, "ON" is allotted in accordance with each open angle of the document pressing cover 10*a* and each distance between the user and the image forming apparatus 100. Specifically, "ON" is allotted in following cases: a case where the distance is 100 cm or less when the open angle is 4 degrees or less; a case where the distance is 90 cm or less when the open angle is 8 degrees or less; a case where the distance is 80 cm or less when the open angle is 12 degrees or less; a case where the distance is 70 cm or less when the open angle is 16 degrees or less; and a case where the distance is 60 cm or less when the open angle is 20 degrees or less. With such allotments, in the case where the motion detector 15 detects the user, when the open angle of the document pressing cover 10a is large, the lamp 17 is more controlled not to be turned on until the user approaches the image forming apparatus 100, compared to when the open angle of the document pressing cover 10a is small.

Generally, in a case where the document pressing cover 10a is wide open, lamp light easily enters eyes of the user. Therefore, in such a case, the user feels dazzled when the lamp 17 is kept turned on for a long time. However, with such allotments, in the case where the motion detector 15 detects the user, when the open angle of the document pressing cover 10a is large, the lamp 17 can be turned on more delayed than when the open angle of the document pressing cover 10a is small. As a result, in the case where the document pressing cover 10a is wide open, the user is free from feeling dazzled because the situation in which the user receives the lamp light for a long time can be avoided. Additionally, according to such control, even in the case where the document pressing cover 10a is wide open, the lamp 17 is turned on when the user approaches the image forming apparatus 100, and then the initialization processing to return the mode to the normal mode is automatically started. Therefore, it is possible to shorten the user's waiting time caused by returning the mode from the power saving mode to the normal mode.

FIG. 7 is a flowchart to describe the lamp lighting processing in one or more embodiments. The processing illustrated in FIG. 7 is executed by the CPU 18a.

First, the CPU 18a determines whether the motion detector 15 has detected a user (S60). The CPU 18a repeats the determination processing in S60 at a certain time interval until it is determined that the motion detector 15 has detected the user, and in a case of determining that the motion detector 15 has detected the user (YES in S60), the CPU 18a advances the processing to S61. In S61, the CPU 18a acquires the open angle of the document pressing cover 10a detected by open angle sensors 16a, 16b, and 16c. Note that the processing in S60 and S61 is similar to processing in S50 and S51 illustrated in FIG. 4.

Next, the CPU 18a acquires the distance between the user and the image forming apparatus 100 detected by the motion detector 15 (S62). The distance between the user and the image forming apparatus 100 is detected by the motion detector 15. The motion detector 15 includes a plurality of sensors to detect different distances, and detects the distance between the user and the image forming apparatus 100 depending on a fact that which one of the sensors has worked. Note that the motion detector 15 may be any detector that can detect the distance between the user and the image forming apparatus 100, and does not necessarily include the plurality of sensors. When a request to acquire the distance is received from the CPU 18a, the motion detector 15 detects the distance between the user and the image forming apparatus 100 at this time point, and transmits the detected distance to the CPU 18a. For example, in FIG. 5A, the CPU 18a acquires information indicating that the distance between the user and the image forming apparatus 100 is 90 cm.

Next, the CPU 18a refers to the lamp lighting control table and determines whether "ON" is allotted in a case of having the open angle of the document pressing cover 10a acquired in S61 and the distance between the user and the image forming apparatus 100 acquired in S62 (S63). In a case where "ON" is allotted (YES in S63), the CPU 18a turns on the lamp 17 (S64) and finishes the processing. On the other hand, in a case where "OFF" is allotted (NO in S63), the CPU 18a returns the processing to S62. For example, referring to the lamp lighting control table 1, in a case where the open angle of the document pressing cover 10a is larger than 12 degrees and is 16 degrees or less and additionally the distance between the user and the image forming apparatus 100 is 90 cm, "OFF" is allotted. Therefore, the CPU 18a does not turn on the lamp 17, returns the processing to S62, and reacquires the distance. In FIG. 5A, since Mr. K keeps moving toward the image forming apparatus 100 also after the motion detector 15 has detected Mr. K, the distance between the user and the image forming apparatus 100 becomes shorter in the case where the CPU 18a reacquires the distance. In the case where the reacquired distance between the user and the image forming apparatus 100 is 70 cm or less, "ON" is allotted with reference to the lamp lighting control table 1. Therefore, the CPU 18a turns on the lamp 17 and finishes the processing.

With execution of the processing from S60 to S64 by the CPU 18a, in the case where the motion detector 15 detects the user, it is possible to perform control as illustrated in FIGS. 5A and 5B to: turn on the lamp 17 in accordance with the open angle of the document pressing cover 10a and the distance between the user and the image forming apparatus 100; and start the initialization processing to return the mode from the power saving mode to the normal mode.

One or more embodiments described-below are modified examples of the aforementioned embodiments. Certain aspects of one or more embodiments described-below are in common with the aforementioned embodiments, including a configuration of an image forming apparatus 100. In the aforementioned embodiments, in a case where a motion detector 15 detects a user, a lamp 17 is turned on in accordance with an open angle of a document pressing cover 10a and a distance between the user and the image forming apparatus 100, and then initialization processing to return a mode from a power saving mode to a normal mode is started. In one or more embodiments, in a case where the motion detector 15 detects a user, the lamp 17 is turned on in accordance with the open angle of the document pressing cover 10a and the distance between the user and the image forming apparatus 100, and then the initialization processing to return the mode from the power saving mode to the normal mode is started. However, the open angle of the document pressing cover 10a and the distance between the user and the image forming apparatus 100, which are conditions to turn on the lamp 17, are set in accordance with a height of the image forming apparatus. In other word, in one or more embodiments, in the case where the motion detector 15 detects the user, the lamp is turned on in accordance with the open angle of the document pressing cover 10a, the distance between the user and the image forming apparatus 100, and the height of the image forming apparatus, and then the initialization processing to return the mode from the power saving mode to the normal mode is started. Here, the height of the image forming apparatus represents a distance to a document platen 20 from a floor surface where the image forming apparatus is installed, and in a case where the image forming apparatus is installed on a setting table, a desk, or the like, the height represents a distance to the document platen 20 from the floor surface where the setting table, the desk, or the like is installed. Therefore, the height of the image forming apparatus is varied by a casing size, the number of stages of sheet feeding cassettes, a height of the setting table or the desk, and the like. Note that the height of the image forming apparatus is not necessarily the distance from the floor surface to the document platen 20, and may be a distance from the floor surface to the lamp 17. Hereinafter, the distance to the document platen from the floor surface where the image forming apparatus is installed will be referred to as a "height of the image forming apparatus".

Figure 8A:
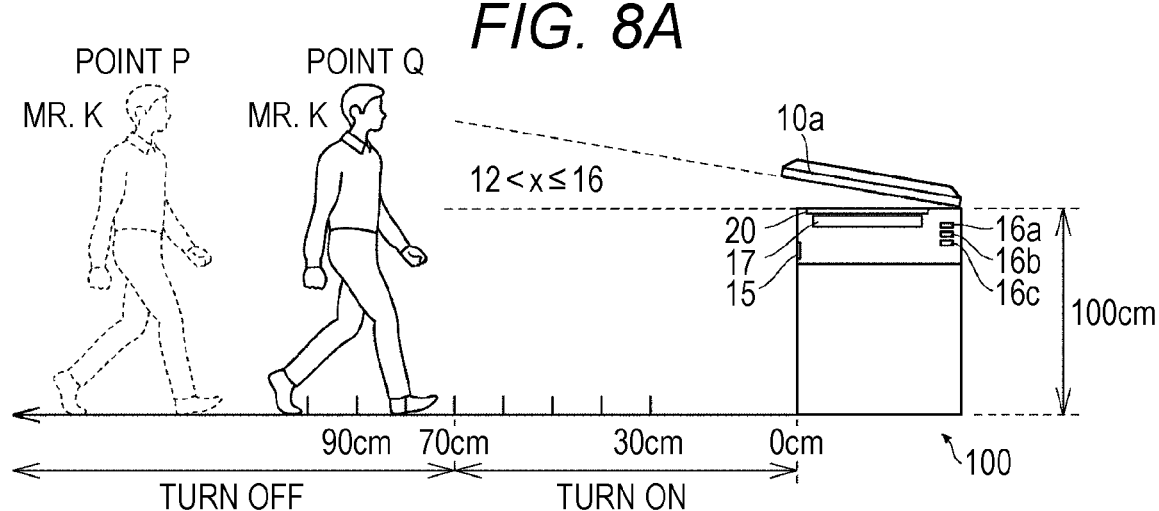
FIGS. 8A and 8B are views illustrating an outline of lamp lighting control in one or more embodiments.
Figure 8B:
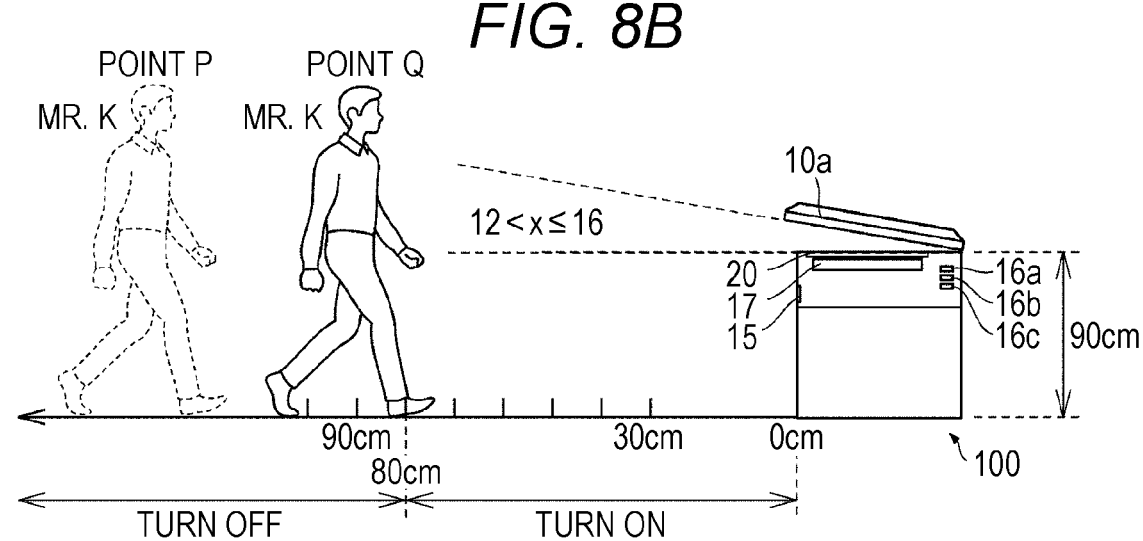
Figure 9A:
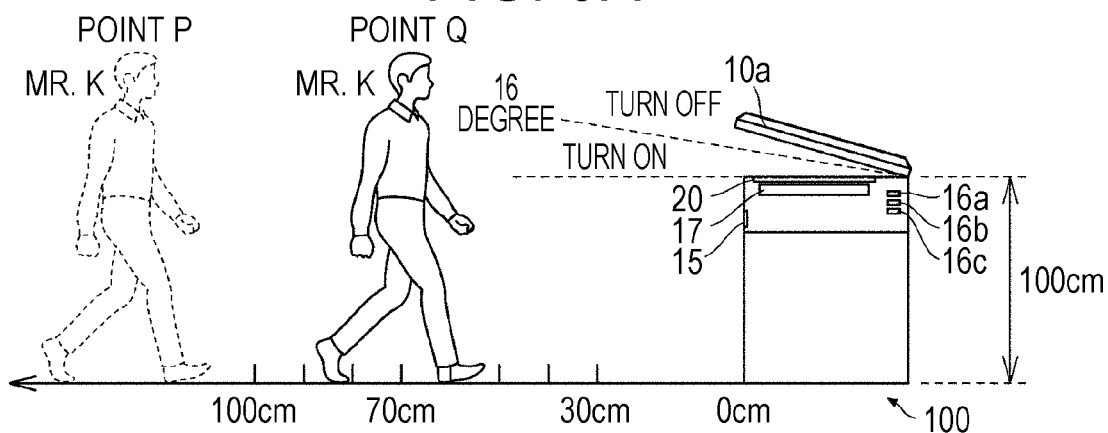
FIGS. 9A and 9B are views illustrating the outline of the lamp lighting control in one or more embodiments.
Figure 9B:
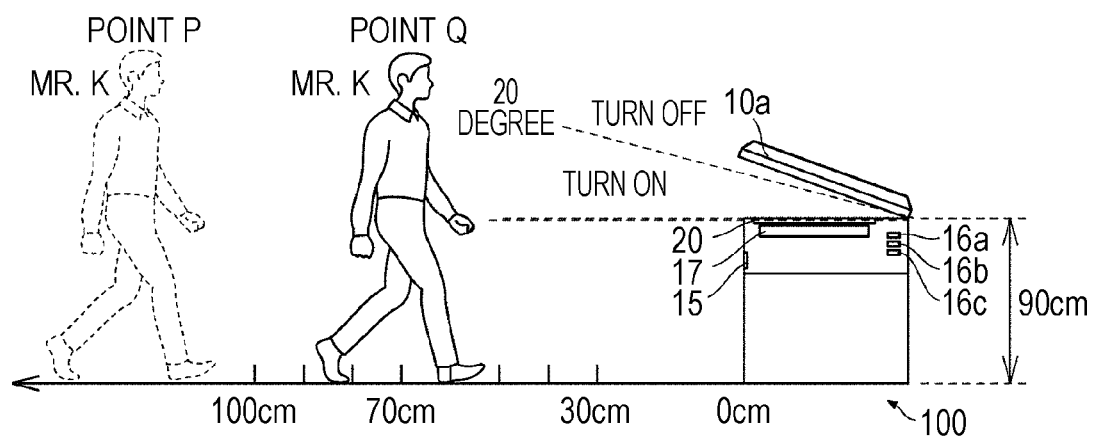

FIGS. 8A to 9B are views illustrating an outline of lamp lighting control in one or more embodiments. FIGS. 8A and 8B illustrate a state in that the distance between the user and the image forming apparatus 100, which is the condition to turn on the lamp 17, can be set in accordance with the height of the image forming apparatus, and FIGS. 9A and 9B illustrate a state in that a threshold value of the open angle of the document pressing cover 10a, which is the condition to turn on the lamp 17, can be set in accordance with the height of the image forming apparatus.

FIGS. 8A and 8B illustrate a situation in which Mr. K who is a user is walking toward the image forming apparatus 100. A point P represents a point where the motion detector 15 starts detecting Mr. K, and a point Q represents a current position of Mr. K. As illustrated in FIGS. 8A and 8B, the distance between the point Q and the image forming apparatus 100 is 90 cm. Additionally, as illustrated in FIGS. 8A and 8B, an open angle x of the document pressing cover 10a is larger than 12 degrees and is 16 degrees or less. As illustrated in FIG. 8A, in a case where the height of the image forming apparatus is 100 cm, the lamp 17 is turned on when the distance between the user and the image forming apparatus 100 becomes 70 cm or less. On the other hand, as illustrated in FIG. 8B, in a case where the height of the image forming apparatus is 90 cm, the lamp 17 is turned on when the distance between the user and the image forming apparatus 100 becomes 80 cm or less.

As illustrated in FIGS. 8A and 8B, in one or more embodiments, in the case where the motion detector 15 detects the user, when the height of the image forming apparatus is high, the lamp 17 is more controlled not to be turned on until the user approaches the image forming apparatus 100, compared to when the height of the image forming apparatus is low. Generally, in the case where the height of the image forming apparatus is high, lamp light easily enters eyes of the user. Therefore, in such a case, the user feels dazzled when the lamp 17 is kept turned on for a long time. However, according to the control like one or more embodiments, in the case where the motion detector 15 detects the user, when the height of the image forming apparatus is high, the lamp 17 can be turned on more delayed than when the height of the image forming apparatus is low. As a result, the user is free from feeling dazzled because in the case where the height of the image forming apparatus is high, a situation in which the user receives the lamp light for a long time can be avoided. Furthermore, according to such control, in the case where the motion detector 15 detects the user, even though the height of the image forming apparatus is high, the lamp 17 is turned on when the user approaches the image forming apparatus 100, and then the initialization processing to return the mode to the normal mode is automatically started. Therefore, it is possible to shorten a user's waiting time caused by returning the mode from the power saving mode to the normal mode.

FIGS. 9A and 9B illustrate a situation in which Mr. K who is a user is walking toward the image forming apparatus 100 according to one or more embodiments. A point P represents a point where the motion detector 15 starts detecting Mr. K, and a point Q represents a current position of Mr. K. As illustrated in FIGS. 9A and 9B, the distance between the point Q and the image forming apparatus 100 is 70 cm. Additionally, "16 degree" illustrated in FIG. 9A and "20 degree" illustrated in FIG. 9B are threshold values of the open angle of the document pressing cover 10a used to determine whether to turn on the lamp 17. As illustrated in FIG. 9A, when the height of the image forming apparatus is 100 cm, the lamp 17 is turned on in a case where the open angle of the document pressing cover 10a is 16 degrees or less. On the other hand, as illustrated in FIG. 9B, when the height of the image forming apparatus is 90 cm, the lamp 17 is turned on in a case where the open angle of the document pressing cover 10a is 20 degrees or less. Note that the angle to be the threshold value is not limited to 16 degrees or 20 degrees. The threshold value may be set to any angle as far as the light of the lamp 17 does not directly enter the eyes of the user, for example.

As illustrated in FIGS. 9A and 9B, in one or more embodiments, in the case where the motion detector 15 detects the user, when the height of the image forming apparatus is high, the threshold value of the open angle of the document pressing cover 10a used to determine whether to turn on the lamp 17 is smaller than when the height of the image forming apparatus is low. Generally, in the case where the height of the image forming apparatus is high, the lamp light easily enters the eyes of the user. In such a case, the user feels dazzled when the document pressing cover 10a is wide open. However, according to the control like one or more embodiments, even when the lamp 17 is turned on in the case where the height of the image forming apparatus is high, the user is free from feeling dazzled because the open angle of the document pressing cover 10a is small. Additionally, according to such control, even in the case where the height of the image forming apparatus is high, the lamp 17 is turned on when the open angle of the document pressing cover 10a is small, and then the initialization processing to return the mode the normal mode is automatically started. Therefore, it is possible to shorten the user's waiting time caused by returning the mode from the power saving mode to the normal mode.

Figure 11:
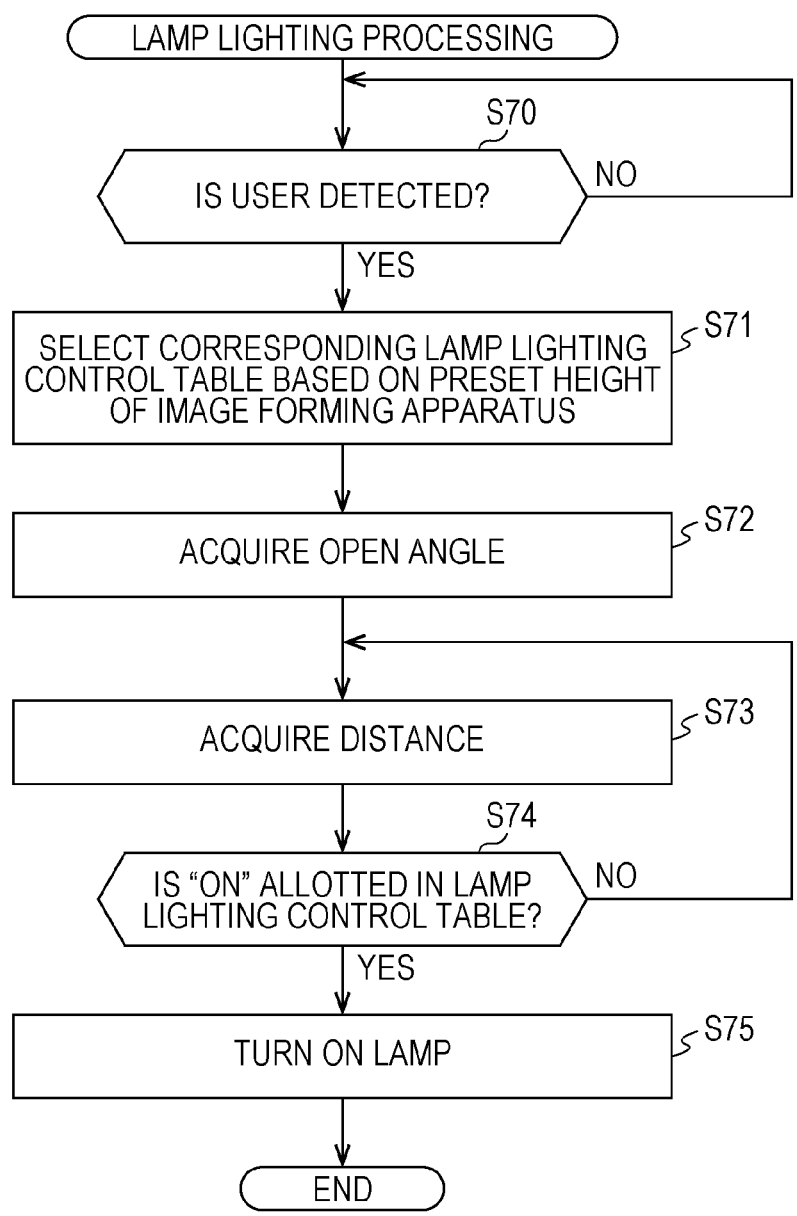
FIG. 11 is a flowchart to describe lamp lighting processing in one or more embodiments.

FIGS. 10A and 10B are diagrams illustrating lamp lighting control tables in one or more embodiments. FIG. 10A illustrates a lamp lighting control table 2 used in a case where the height of the image forming apparatus is 95 cm or more, and FIG. 10B illustrates a lamp lighting control table 3 used in a case where the height of the image forming apparatus is less than 95 cm. These lamp lighting control tables are stored in a ROM 18b. In these lamp lighting control tables, "ON" or "OFF" of the lamp 17 is allotted in accordance with each open angle of the document pressing cover 10a and each distance between a user and the image forming apparatus 100. In a case where a relation between the open angle and the distance corresponds to "ON" in these lamp lighting control tables, the lamp 17 is turned on, and in a case where the relation corresponds to "OFF", the lamp 17 is not turned on. The lamp lighting control illustrated in FIGS. 8A and 8B or FIGS. 9A and 9B is achieved by referring to these lamp lighting control tables in lamp lighting processing by a CPU 18a (FIG. 11).

In the lamp lighting control table 2, in a case where the distance between the user and the image forming apparatus 100 is 50 cm or less, "ON" is allotted regardless of the open angle of the document pressing cover 10a. On the other hand, in a case where the distance between the user and the image forming apparatus 100 exceeds 50 cm, "ON" is allotted in accordance with the open angle of the document pressing cover 10a and the distance between the user and the image forming apparatus 100. Specifically, "ON" is allotted in following cases: a case where the distance is 100 cm or less when the open angle is 4 degrees or less; a case where the distance is 90 cm or less when the open angle is 8 degrees or less; a case where the distance is 80 cm or less when the open angle is 12 degrees or less; a case where the distance is 70 cm or less when the open angle is 16 degrees or less; and a case where the distance is 60 cm or less when the open angle is 20 degrees or less.

In the lamp lighting control table 3, in the case where the distance between the user and the image forming apparatus 100 is 60 cm or less, "ON" is allotted regardless of the open angle of the document pressing cover 10a. On the other hand, in the case where the distance between the user and the image forming apparatus 100 exceeds 60 cm, "ON" is allotted in accordance with each open angle of the document pressing cover 10a and each distance between the user and the image forming apparatus 100. Specifically, "ON" is allotted in following cases: a case where the distance is 100 cm or less when the open angle is 8 degrees or less; a case where the distance is 90 cm or less when the open angle is 12 degrees or less; a case where the distance is 80 cm or less when the open angle is 16 degrees or less; and a case where the distance is 70 cm or less when the open angle is 20 degrees.

With such allotments in the lamp lighting control table 2 and the lamp lighting control table 3, in the case where the motion detector 15 detects the user, when the height of the image forming apparatus is high, the lamp 17 is more controlled not to be turned on until the user approaches the image forming apparatus 100, compared to when the height of the image forming apparatus is low. Generally, in the case where the height of the image forming apparatus is high, the lamp light easily enters eyes of the user. Therefore, in such a case, the user feels dazzled when the lamp 17 is kept turned on for a long time. However, with such allotments, in the case where the motion detector 15 detects the user, when the height of the image forming apparatus is high, the lamp 17 can be turned on more delayed than when the height of the image forming apparatus is low. As a result, the user is free from feeling dazzled because in the case where the height of the image forming apparatus is high, the situation in which the user receives the lamp light for a long time can be avoided. Furthermore, according to such control, in the case where the motion detector 15 detects the user, even though the height of the image forming apparatus is high, the lamp 17 is turned on when the user approaches the image forming apparatus 100, and then the initialization processing to return the mode to the normal mode is automatically started. Therefore, it is possible to shorten the user's waiting time caused by returning the mode from the power saving mode to the normal mode.

Additionally, with such allotments in the lamp lighting control table 2 and the lamp lighting control table 3, in the case where the motion detector 15 detects the user, when the height of the image forming apparatus is high, the threshold value of the open angle of the document pressing cover 10a used to determine whether to turn on the lamp 17 is smaller than when the height of the image forming apparatus is low. Generally, in the case where the height of the image forming apparatus is high, the lamp light easily enters the eyes of the user. In such a case, the user feels dazzled when the document pressing cover 10a is wide open. However, with such allotments, the user is free from feeling dazzled because the open angle of the document pressing cover 10a is small even though the lamp 17 is turned on in the case where the height of the image forming apparatus is high. Additionally, according to such control, even in the case where the height of the image forming apparatus is high, the lamp 17 is turned on when the open angle of the document pressing cover 10a is small, and then the initialization processing to return the mode the normal mode is automatically started. Therefore, it is possible to shorten the user's waiting time caused by returning the mode from the power saving mode to the normal mode.

Furthermore, with such allotments in the lamp lighting control table 2 and the lamp lighting control table 3, in the case where the motion detector 15 detects the user, when the distance between the user and the image forming apparatus 100 becomes a certain distance or less (for example, 50 cm or less in FIG. 10A, and 60 cm or less in FIG. 10B), the lamp 17 is turned on regardless of the open angle of the document pressing cover 10a, and the initialization processing to return the mode to the normal mode is automatically started. Therefore, it is possible to shorten the user's waiting time caused by returning the mode from the power saving mode to the normal mode.

Additionally, with such allotments in the lamp lighting control table 2 and the lamp lighting control table 3, in the case where the motion detector 15 detects the user, when the open angle of the document pressing cover 10a is large, the lamp 17 is more controlled not to be turned on until the user approaches the image forming apparatus 100, compared to when the open angle of the document pressing cover 10a is small. Generally, in the case where the document pressing cover 10a is wide open, the lamp light easily enters eyes of the user. Therefore, in such a case, the user feels dazzled when the lamp 17 is kept turned on for a long time. However, with such allotments, in the case where the motion detector 15 detects the user, when the open angle of the document pressing cover 10a is large, the lamp 17 can be turned on more delayed than when the open angle of the document pressing cover 10a is small. As a result, in the case where the document pressing cover 10a is wide open, the user is free from feeling dazzled because the situation in which the user receives the lamp light for a long time can be avoided. Additionally, with such allotments, even in the case where the document pressing cover 10a is wide open, the lamp 17 is turned on when the user approaches the image forming apparatus 100, and then the initialization processing to return the mode to the normal mode is automatically started. Therefore, it is possible to shorten the user's waiting time caused by returning the mode from the power saving mode to the normal mode.

FIG. 11 is a flowchart to describe the lamp lighting processing in one or more embodiments. The processing illustrated in FIG. 11 is executed by the CPU 18a. Processing other than S71 in the processing illustrated in FIG. 11 is similar to processing in S60 to S64 illustrated in FIG. 7, and therefore, a description thereof will be omitted.

The CPU 18a performs the processing in S71 between the processing in S60 and the processing in S61 illustrated in FIG. 7. In S71, the CPU 18a selects a corresponding lamp lighting control table based on a preset height of an image forming apparatus. The preset height of the image forming apparatus is a height of an image forming apparatus preliminarily set by a user in the image forming apparatus 100, and the user presets the height of the image forming apparatus from an operation panel 11a. For example, in a case where the user presets the height of the image forming apparatus as 90 cm, the CPU 18a selects the lamp lighting control table 3 illustrated in FIG. 10B.

With execution of the processing from S70 to S75 by the CPU 18a, in a case where the motion detector 15 detects the user, it is possible to perform control as illustrated in FIGS. 8A and 8B and FIGS. 9A and 9B to: turn on the lamp in accordance with the open angle of the document pressing cover 10a, the distance between the user and the image forming apparatus 100, and the height of the image forming apparatus; and start the initialization processing to return the mode from the power saving mode to the normal mode.

Note that the CPU 18a may shift the processing to S74 without executing the processing in S73 after the processing in S72. In a case of YES in S74, the CPU 18a turns on the lamp 17, and in a case of NO in S74, the CPU 18a finishes the processing without turning on the lamp 17. With the above-described processing, it is possible to perform control to: turn on the lamp in accordance with the open angle of the document pressing cover 10a and the height of the image forming apparatus regardless of the distance between the user and the image forming apparatus 100.

One or more embodiments described-below are modified examples of the aforementioned embodiments. Certain aspects of one or more embodiments described-below are in common with the aforementioned embodiments, including a configuration of an image forming apparatus 100. In the aforementioned embodiments, in a case where a motion detector 15 detects a user, a lamp 17 is turned on in accordance with an open angle of a document pressing cover 10a and a distance between the user and the image forming apparatus 100, and then initialization processing to return a mode from a power saving mode to a normal mode is started. In one or more embodiments, in a case where the motion detector 15 detects a user, the lamp 17 is turned on in accordance with the open angle of the document pressing cover 10a and the distance between the user and the image forming apparatus 100, and then the initialization processing to return the mode from the power saving mode to the normal mode is started. However, the open angle of the document pressing cover 10a and the distance between the user and the image forming apparatus 100, which are conditions to turn on the lamp 17, are set in accordance with a standing height of the user. In other word, in one or more embodiments, in the case where the motion detector 15 detects the user, the lamp is turned on in accordance with the open angle of the document pressing cover 10a, the distance between the user and the image forming apparatus 100, and the standing height of the user, and then the initialization processing to return the mode from the power saving mode to the normal mode is started. Here, the standing height of the user represents a standing height of a user who uses the image forming apparatus 100, and in the case where there is a plurality of users using the image forming apparatus 100, the standing height may be an average standing height of the users. Hereinafter, the standing height of the user who uses the image forming apparatus 100 will be referred to as a "user's standing height".

Figure 12A:
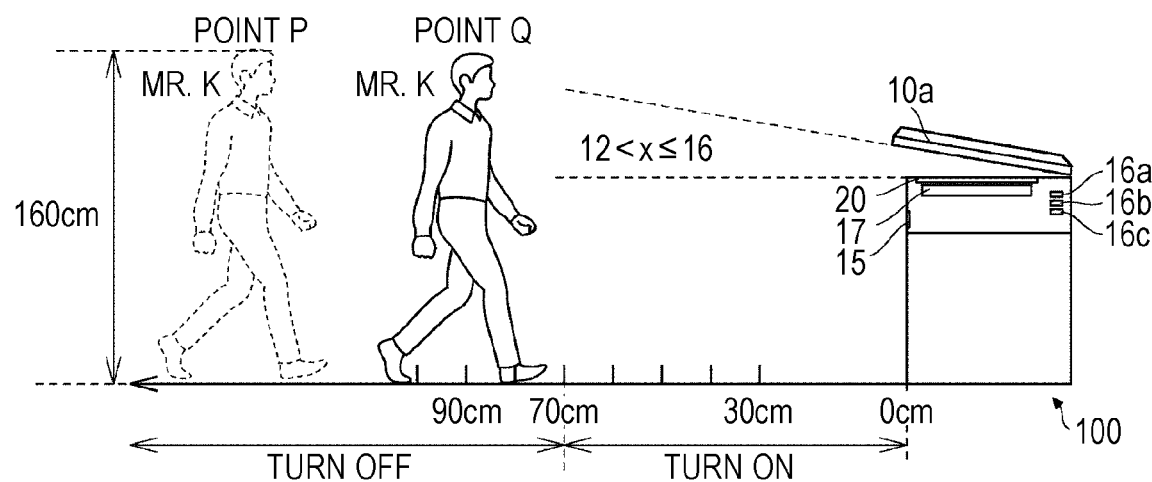
FIGS. 12A and 12B are views illustrating an outline of lamp lighting control in one or more embodiments.
Figure 12B:
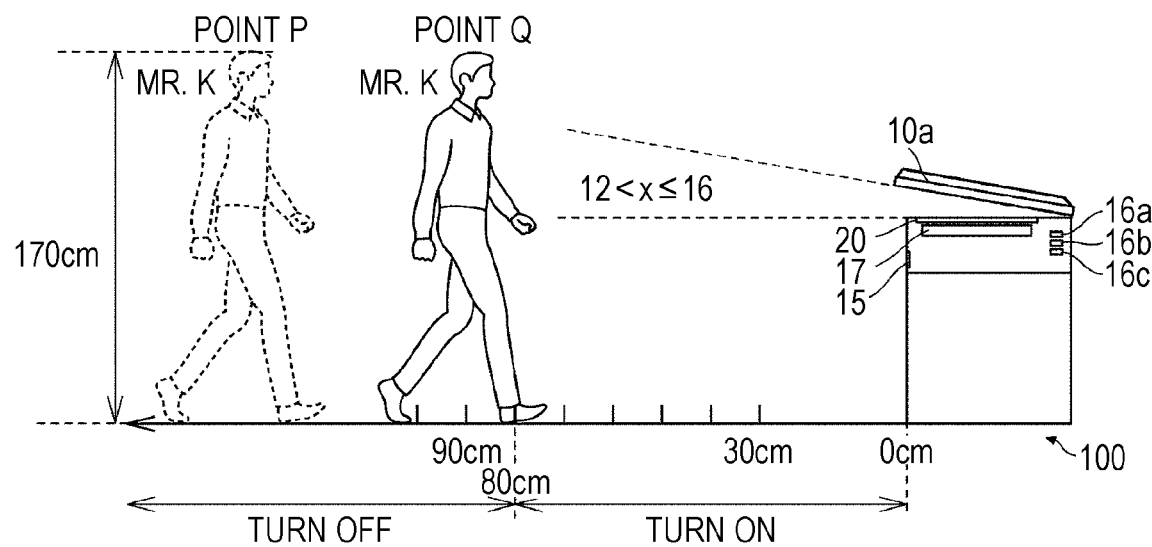
Figure 13A:
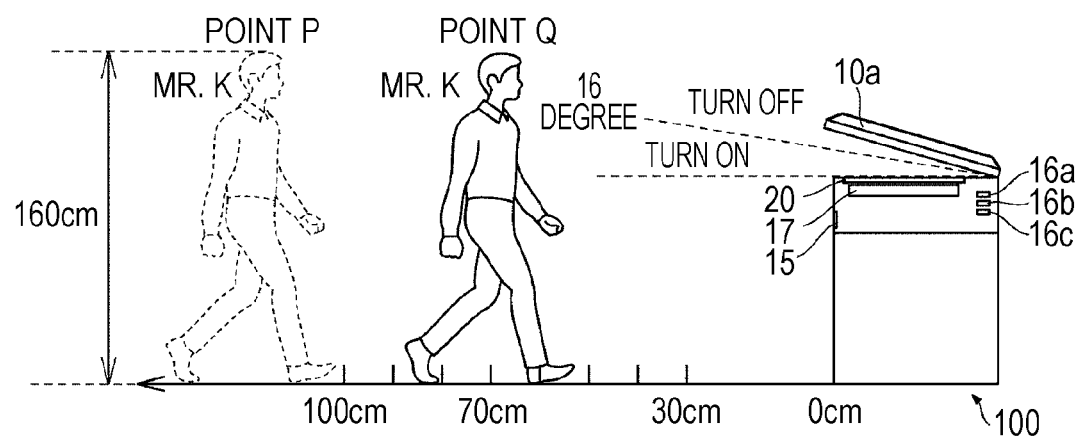
FIGS. 13A and 13B are views illustrating an outline of the lamp lighting control in one or more embodiments.
Figure 13B:
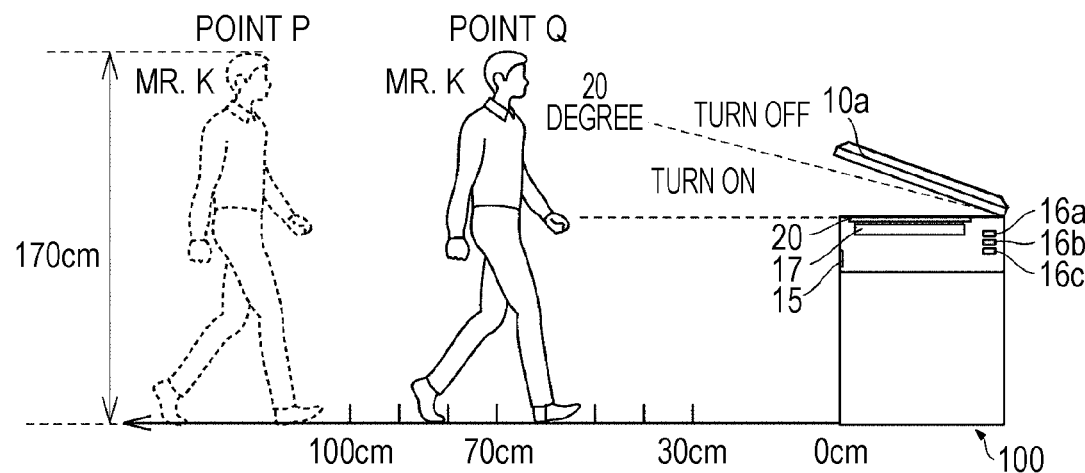

FIGS. 12A to 13B are views illustrating an outline of lamp lighting control in one or more embodiments. FIGS. 12A and 12B illustrate a state in that the distance between the user and the image forming apparatus 100, which is the condition to turn on the lamp 17, can be set in accordance with the user's standing height, and FIGS. 13A and 13B illustrate a state in that a threshold value of the open angle of the document pressing cover 10a, which is the condition to turn on the lamp 17, can be set in accordance with the user's standing height.

FIGS. 12A and 12B illustrate a situation in which Mr. K who is a user is walking toward the image forming apparatus 100. A point P represents a point where the motion detector 15 starts detecting Mr. K, and a point Q represents a current position of Mr. K. As illustrated in FIGS. 12A and 12B, the distance between the point Q and the image forming apparatus 100 is 90 cm. Additionally, as illustrated in FIGS. 12A and 12B, an open angle x of the document pressing cover 10a is larger than 12 degrees and is 16 degrees or less. As illustrated in FIG. 12A, in a case where the user's standing height is 160 cm, the lamp 17 is turned on when the distance between the user and the image forming apparatus 100 becomes 70 cm or less. On the other hand, as illustrated in FIG. 12B, in a case where the user's standing height is 170 cm, the lamp 17 is turned on when the distance between the user and the image forming apparatus 100 becomes 80 cm or less.

As illustrated in FIGS. 12A and 12B, in one or more embodiments, in the case where the motion detector 15 detects the user, when the user's standing height is low, the lamp 17 is more controlled not to be turned on until the user approaches the image forming apparatus 100, compared to when the user's standing height is high. Generally, in the case where the user's standing height is low, the lamp light easily enters eyes of the user. Therefore, in such a case, the user feels dazzled when the lamp 17 is kept turned on for a long time. However, according to the control like one or more embodiments, in the case where the motion detector 15 detects the user, when the user's standing height is low, the lamp 17 can be turned on more delayed than when the user's standing height is high. As a result, the user is free from feeling dazzled because in the case where the user's standing height is low, a situation in which the user receives the lamp light for a long time can be avoided. Furthermore, according to such control, even though the user's standing height is low, in the case where the motion detector 15 detects the user, the lamp 17 is turned on when the user approaches the image forming apparatus 100, and then the initialization processing to return the mode to the normal mode is automatically started. Therefore, it is possible to shorten a user's waiting time caused by returning the mode from the power saving mode to the normal mode.

FIGS. 13A and 13B illustrate a situation in which Mr. K who is a user is walking toward the image forming apparatus 100. A point P represents a point where the motion detector 15 starts detecting Mr. K, and a point Q represents a current position of Mr. K. As illustrated in FIGS. 13A and 13B, the distance between the point Q and the image forming apparatus 100 is 70 cm. Additionally, "16 degree" illustrated in FIG. 13A and "20 degree" illustrated in FIG. 13B are threshold values of the open angle of the document pressing cover 10a used to determine whether to turn on the lamp 17. As illustrated in FIG. 13A, when the user's standing height is 160 cm, the lamp 17 is turned on in case where the open angle of the document pressing cover 10a is 16 degrees or less. On the other hand, as illustrated in FIG. 13B, when the user's standing height is 170 cm, the lamp 17 is turned on in a case where the open angle of the document pressing cover 10a is 20 degrees or less. Note that the angle to be the threshold value is not limited to 16 degrees or 20 degrees. The threshold value may be set to any angle as far as the light of the lamp 17 does not directly enter the eyes of the user, for example.

As illustrated in FIGS. 13A and 13B, in one or more embodiments, in the case where the motion detector 15 detects the user, when the user's standing height is low, the threshold value of the open angle of the document pressing cover 10a used to determine whether to turn on the lamp 17 is smaller than when the user's standing height is high. Generally, in the case where the user's standing height is low, the lamp light easily enters the eyes of the user. In such a case, the user feels dazzled when the document pressing cover 10a is wide open. However, according to the control like one or more embodiments, even though the lamp 17 is turned on in the case where the user's standing height is low, the user is free from feeling dazzled because the open angle of the document pressing cover 10a is small. Additionally, according to such control, even in the case where the user's standing height is low, the lamp 17 is turned on when the open angle of the document pressing cover 10a is small, and then the initialization processing to return the mode the normal mode is automatically started. Therefore, it is possible to shorten the user's waiting time caused by returning the mode from the power saving mode to the normal mode.

Figure 15:
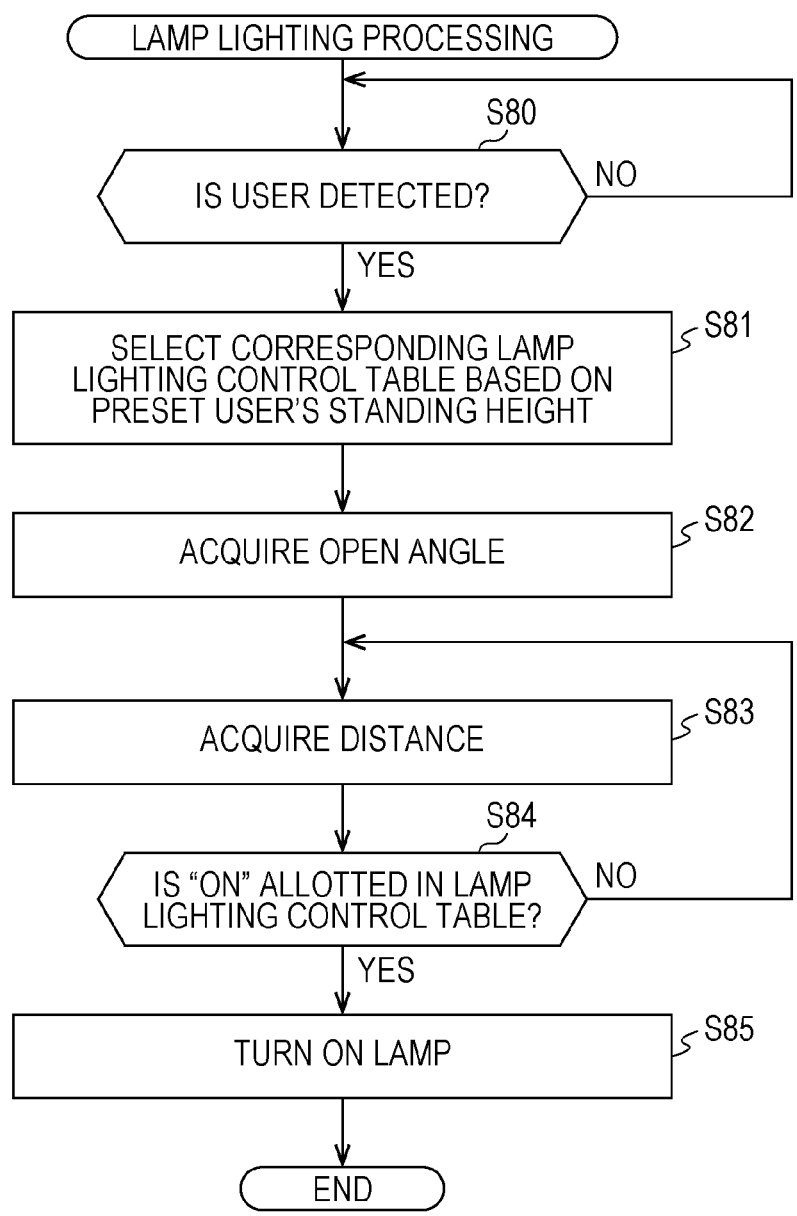
FIG. 15 is a flowchart to describe lamp lighting processing in one or more embodiments.

FIGS. 14A and 14B are diagrams illustrating lamp lighting control tables in one or more embodiments. FIG. 14A illustrates a lamp lighting control table 4 used in a case where the user's standing height is less than 165 cm, and FIG. 14B illustrates a lamp lighting control table 5 used in a case where the user's standing height is 165 cm or more. These lamp lighting control tables are stored in a ROM 18b. In these lamp lighting control tables, "ON" or "OFF" of the lamp 17 is allotted in accordance with each open angle of the document pressing cover 10a and each distance between a user and the image forming apparatus 100. In a case where a relation between the open angle and the distance corresponds to "ON" in these lamp lighting control tables, the lamp 17 is turned on, and in a case where the relation corresponds to "OFF", the lamp 17 is not turned on. The lamp lighting control illustrated in FIGS. 12A and 12B or FIGS. 13A and 13B is achieved by referring to these lamp lighting control tables in lamp lighting processing by a CPU 18a (FIG. 15).

In the lamp lighting control table 4, in a case where the distance between the user and the image forming apparatus 100 is 50 cm or less, "ON" is allotted regardless of the open angle of the document pressing cover 10a. On the other hand, in a case where the distance between the user and the image forming apparatus 100 exceeds 50 cm, "ON" is allotted in accordance with the open angle of the document pressing cover 10a and the distance between the user and the image forming apparatus 100. Specifically, "ON" is allotted in following cases: a case where the distance is 100 cm or less when the open angle is 4 degrees or less; a case where the distance is 90 cm or less when the open angle is 8 degrees or less; a case where the distance is 80 cm or less when the open angle is 12 degrees or less; a case where the distance is 70 cm or less when the open angle is 16 degrees or less; and a case where the distance is 60 cm or less when the open angle is 20 degrees or less.

In the lamp lighting control table 5, in a case where the distance between the user and the image forming apparatus 100 is 60 cm or less, "ON" is allotted regardless of the open angle of the document pressing cover 10a. On the other hand, in the case where the distance between the user and the image forming apparatus 100 exceeds 60 cm, "ON" is allotted in accordance with each open angle of the document pressing cover 10a and each distance between the user and the image forming apparatus 100. Specifically, "ON" is allotted in following cases: a case where the distance is 100 cm or less when the open angle is 8 degrees or less; a case where the distance is 90 cm or less when the open angle is 12 degrees or less; a case where the distance is 80 cm or less when the open angle is 16 degrees or less; and a case where the distance is 70 cm or less when the open angle is 20 degrees.

With such allotments in the lamp lighting control table 4 and the lamp lighting control table 5, in the case where the motion detector 15 detects the user, when the user's standing height is low, the lamp 17 is more controlled not to be turned on until the user approaches the image forming apparatus 100, compared to when the user's standing height is high.

Generally, in the case where the user's standing height is low, the lamp light easily enters eyes of the user. Therefore, in such a case, the user feels dazzled when the lamp 17 is kept turned on for a long time. However, with such allotments, in the case where the motion detector 15 detects the user, when the user's standing height is low, the lamp 17 can be turned on more delayed than when the user's standing height is high. As a result, the user is free from feeling dazzled because in the case where the user's standing height is low, the situation in which the user receives the lamp light for a long time can be avoided. Furthermore, according to such control, even though the user's standing height is low, in the case where the motion detector 15 detects the user, the lamp 17 is turned on when the user approaches the image forming apparatus 100, and then the initialization processing to return the mode to the normal mode is automatically started. Therefore, it is possible to shorten a user's waiting time caused by returning the mode from the power saving mode to the normal mode.

Additionally, with such allotments in the lamp lighting control table 4 and the lamp lighting control table 5, in the case where the motion detector 15 detects the user, when the user's standing height is low, the threshold value of the open angle of the document pressing cover 10a used to determine whether to turn on the lamp 17 is smaller than when the user's standing height is high. Generally, in the case where the user's standing height is low, the lamp light easily enters the eyes of the user. In such a case, the user feels dazzled when the document pressing cover 10a is wide open. However, with such allotments, even though the lamp 17 is turned on in the case where the user's standing height is low, the user is free from feeling dazzled because the open angle of the document pressing cover 10a is small. Additionally, according to such control, even in the case where the user's standing height is low, the lamp 17 is turned on when the open angle of the document pressing cover 10a is small, and then the initialization processing to return the mode the normal mode is automatically started. Therefore, it is possible to shorten the user's waiting time caused by returning the mode from the power saving mode to the normal mode.

Furthermore, with such allotments in the lamp lighting control table 4 and the lamp lighting control table 5, in the case where the motion detector 15 detects the user, when the distance between the user and the image forming apparatus 100 becomes a certain distance or less (for example, 50 cm or less in FIG. 14A, and 60 cm or less in FIG. 14B), the lamp 17 is turned on regardless of the open angle of the document pressing cover 10a, and the initialization processing to return the mode to the normal mode is automatically started. Therefore, it is possible to shorten the user's waiting time caused by returning the mode from the power saving mode to the normal mode.

Moreover, with such allotments in the lamp lighting control table 4 and the lamp lighting control table 5, in the case where the motion detector 15 detects the user, when the open angle of the document pressing cover 10a is large, the lamp 17 is more controlled not to be turned on until the user approaches the image forming apparatus 100, compared to when the open angle of the document pressing cover 10a is small. Generally, in a case where the document pressing cover 10a is wide open, lamp light easily enters eyes of the user. Therefore, in such a case, the user feels dazzled when the lamp 17 is kept turned on for a long time. However, with such allotments, in the case where the motion detector 15 detects the user, when the open angle of the document pressing cover 10a is large, the lamp 17 can be turned on more delayed than when the open angle of the document pressing cover 10a is small. As a result, in the case where the document pressing cover 10a is wide open, the user is free from feeling dazzled because the situation in which the user receives the lamp light for a long time can be avoided. Additionally, with such allotments, even in the case where the document pressing cover 10a is wide open, the lamp 17 is turned on when the user approaches the image forming apparatus 100, and then the initialization processing to return the mode to the normal mode is automatically started. Therefore, it is possible to shorten the user's waiting time caused by returning the mode from the power saving mode to the normal mode.

FIG. 15 is a flowchart to describe the lamp lighting processing in one or more embodiments. The processing illustrated in FIG. 15 is executed by the CPU 18a. Processing other than S81 in the processing illustrated in FIG. 15 is similar to processing from S60 to S64 illustrated in FIG. 7, and therefore, a description thereof will be omitted.

The CPU 18a performs the processing in S81 between the processing in S60 and the processing in S61 illustrated in FIG. 7. In S81, the CPU 18a selects a corresponding lamp lighting control table based on a preset user's standing height. The preset user's standing height is a standing height of a user preliminarily set from an operation panel 11a by the user. For example, in a case where the user presets the user's standing height as 170 cm, the CPU 18a selects the lamp lighting control table 5 illustrated in FIG. 14B.

With execution of the processing from S80 to S85 by the CPU 18a, in a case where the motion detector 15 detects the user, it is possible to perform control as illustrated in FIGS. 12A and 12B and FIGS. 13A and 13B to: turn on the lamp in accordance with the open angle of the document pressing cover 10a, the distance between the user and the image forming apparatus 100, and the user's standing height; and start the initialization processing to return the mode from the power saving mode to the normal mode.

Note that the CPU 18a may shift the processing to S84 without performing the processing in S83 after the processing in S82. In a case of YES in S84, the CPU 18a turns on the lamp 17, and in a case of NO in S84, the CPU 18a finishes the processing without turning on the lamp 17. With the above-described processing, it is possible to perform control to turn on the lamp in accordance with the open angle of the document pressing cover 10a and the user's standing height, regardless of the distance between the user and the image forming apparatus 100.

One or more embodiments described-below differ from the aforementioned embodiments in lighting control for a lamp 17 at the time of a motion detector 15 detecting a user. Certain aspects of one or more embodiments described-below are in common with the aforementioned embodiments, including a configuration of an image forming apparatus 100. In one or more embodiments, the lamp 17 is turned on under a condition that an open angle of a document pressing cover 10a is a predetermined angle or less at the time of the motion detector 15 detecting the user, and then initialization processing to return a mode from a power saving mode to a normal mode is started. On the other hand, in one or more embodiments, in the case where the motion detector 15 detects the user, the lamp 17 is turned on after elapse of a predetermined period preset in accordance with each open angle of the document pressing cover 10a, and then the initialization processing to return the mode from the power saving mode to the normal mode is started.

FIGS. 16A and 16B are views illustrating an outline of the lamp lighting control in one or more embodiments. FIGS. 16A and 16B illustrate a situation in which Mr. K who is a user is walking toward the image forming apparatus 100. A point Q represents a point where the motion detector 15 detects Mr. K. Additionally, "TURN ON AFTER 2.0 SEC." illustrated in FIG. 16A indicates that the lamp 17 is turned on after elapse of 2.0 seconds from when the motion detector 15 detects the user, and "TURN ON AFTER 2.5 SEC." illustrated in FIG. 16B indicates that the lamp 17 is turned on after elapse of 2.5 seconds from when the motion detector 15 detects the user. As illustrated in FIG. 16A, when an open angle x of the document pressing cover 10a is larger than 12 degrees and is 16 degrees or less, the lamp 17 is turned on after elapse of 2.0 seconds from when the motion detector 15 detects the user. On the other hand, as illustrated in FIG. 16B, when the open angle x of the document pressing cover 10a is larger than 16 degrees and is 20 degrees or less, the lamp 17 is turned on after elapse of 2.5 seconds from when the motion detector 15 detects the user. Note that a period from when the motion detector 15 detects the user until the lamp 17 is turned on may be set in accordance with a distance between the user and the image forming apparatus 100 and a walking speed of the user, and is not limited to 2.0 seconds or 2.5 seconds.

As illustrated in FIGS. 16A and 16B, in one or more embodiments, in the case where the motion detector 15 detects the user, when the open angle of the document pressing cover 10a is large, the period from when the motion detector 15 detects the user until the lamp 17 is turned on is longer than when the open angle of the document pressing cover 10a is small. Generally, in a case where the document pressing cover 10a is wide open, lamp light easily enters eyes of the user. Therefore, in such a case, the user feels dazzled when the lamp 17 is kept turned on for a long time. However, according to the control like one or more embodiments, in the case where the motion detector 15 detects the user, when the open angle of the document pressing cover 10a is large, the lamp 17 can be turned on more delayed than when the open angle of the document pressing cover 10a is small. As a result, in the case where the document pressing cover 10a is wide open, the user is free from feeling dazzled because a situation in which the user receives the lamp light for a long time can be avoided. Additionally, according to such control, even in the case where the document pressing cover 10a is wide open, the lamp 17 is turned on after elapse of the predetermined period, and then the initialization processing to return the mode to the normal mode is automatically started. Therefore, it is possible to shorten a user's waiting time caused by returning the mode from the power saving mode to the normal mode.

FIG. 17 is a diagram illustrating a lamp lighting control table 6 according to one or more embodiments. The lamp lighting control table 6 is stored in a ROM 18b. In the lamp lighting control table 6, a "PERIOD" is allotted in accordance with each open angle of the document pressing cover 10a. The "PERIOD" represents a period from the motion detector 15 detects a user until the lamp 17 is turned on. The lamp lighting control illustrated in FIGS. 16A and 16B is achieved by referring to the lamp lighting control table 6 in lamp lighting processing by a CPU 18a (FIG. 18).

In the lamp lighting control table 6, the larger the open angle is, the longer period the open angle is allotted with. With such allotments, in case where the motion detector 15 detects the user, when the open angle of the document pressing cover 10a is large, the period from when the motion detector 15 detects the user until the lamp 17 is turned on is longer than when the open angle of the document pressing cover 10a is small. Generally, in a case where the document pressing cover 10a is wide open, lamp light easily enters eyes of the user. Therefore, in such a case, the user feels dazzled when the lamp 17 is kept turned on for a long time. However, with such allotments, in the case where the motion detector 15 detects the user, when the open angle of the document pressing cover 10a is large, the lamp 17 can be turned on more delayed than when the open angle of the document pressing cover 10a is small. As a result, in the case where the document pressing cover 10a is wide open, the user is free from feeling dazzled because the situation in which the user receives the lamp light for a long time can be avoided. Additionally, according to such control, even in the case where the document pressing cover 10a is wide open, the lamp 17 is turned on after elapse of the predetermined period, and then the initialization processing to return the mode to the normal mode is automatically started. Therefore, it is possible to shorten the user's waiting time caused by returning the mode from the power saving mode to the normal mode.

Figure 18:
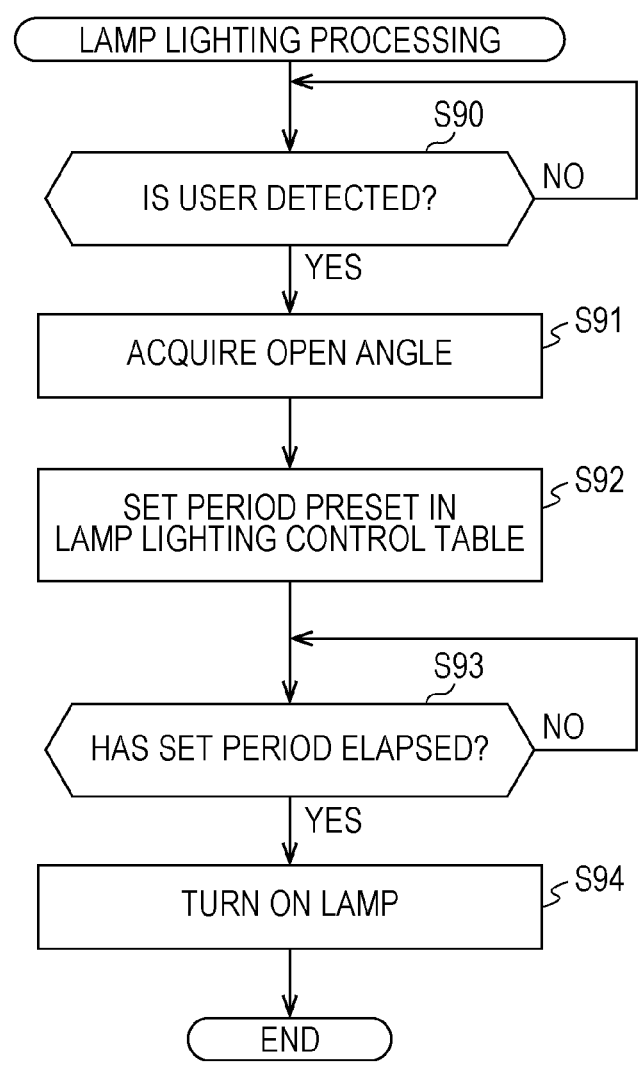
FIG. 18 is a flowchart illustrating lamp lighting processing in one or more embodiments.

FIG. 18 is a flowchart to describe the lamp lighting processing in one or more embodiments. The processing illustrated in FIG. 18 is executed by the CPU 18a.

First, the CPU 18a determines whether the motion detector 15 has detected a user (S90). The CPU 18a repeats the determination processing in S90 at a certain time interval until it is determined that the motion detector 15 has detected the user, and in a case of determining that the motion detector 15 has detected the user (YES in S90), the CPU 18a advances the processing to S91. In S91, the CPU 18a acquires the open angle of the document pressing cover 10a detected by open angle sensors 16a, 16b, and 16c. Note that the processing in S90 and S91 is similar to processing in S50 and S51 illustrated in FIG. 4.

Next, the CPU 18a sets, for a timer, a period preset in the lamp lighting control table (S92). For example, in a case where the open angle of the document pressing cover 10a acquired in S91 is larger than 12 degrees and is 16 degrees or less, the CPU 18a sets 2.0 seconds for the timer.

Next, the CPU 18a determines whether the set time has elapsed (S93). In a case where the set time has elapsed (YES in S93), the CPU 18a turns on the lamp 17 (S94) and finishes the processing. On the other hand, in a case where the set time has not elapsed yet (NO in S93), the CPU 18a repeats the processing in S93 until the set time elapses. For example, in a case where 2.0 seconds set for the timer have not elapsed yet in S92, the CPU 18a repeats the determination on whether 2.0 seconds have elapsed without turning on the lamp 17. In a case of determining that 2.0 seconds have elapsed, the CPU 18a turns on the lamp 17 and finishes the processing.

With execution of the processing from S90 to S94 by the CPU 18a, in the case where the motion detector 15 detects the user, it is possible to perform control as illustrated in FIGS. 16A and 16B to: turn on the lamp 17 after elapse of the predetermined period preset in accordance with each open angle of the document pressing cover 10a; and start the initialization processing to return the mode from the power saving mode to the normal mode.

One or more embodiments described-below differ from the aforementioned embodiments in lighting control for a lamp 17 at the time of a motion detector 15 detecting a user. Additionally, one or more embodiments described-below differ from the aforementioned embodiments in that the motion detector 15 in the aforementioned embodiments merely detects a user who is approaching the image forming apparatus 100, whereas the motion detector 15 in one or more described-below embodiments can detect a user's face in each of a plurality of detection areas divided in a height direction. Certain aspects of one or more embodiments described-below are in common with the aforementioned embodiments, including a configuration of the image forming apparatus 100. In one or more embodiments, the lamp 17 is turned on under a condition that an open angle of a document pressing cover 10a is a predetermined angle or less at the time of the motion detector 15 detecting the user, and then initialization processing to return a mode from a power saving mode to a normal mode is started. On the other hand, in one or more embodiments, the lamp 17 is turned on when the open angle of the document pressing cover 10a is equal to or less than an angle preset in accordance with each area where the user's face is detected at the time of the motion detector 15 detecting the user, and then the initialization processing to return the mode from the power saving mode to the normal mode is started.

Figure 19A:
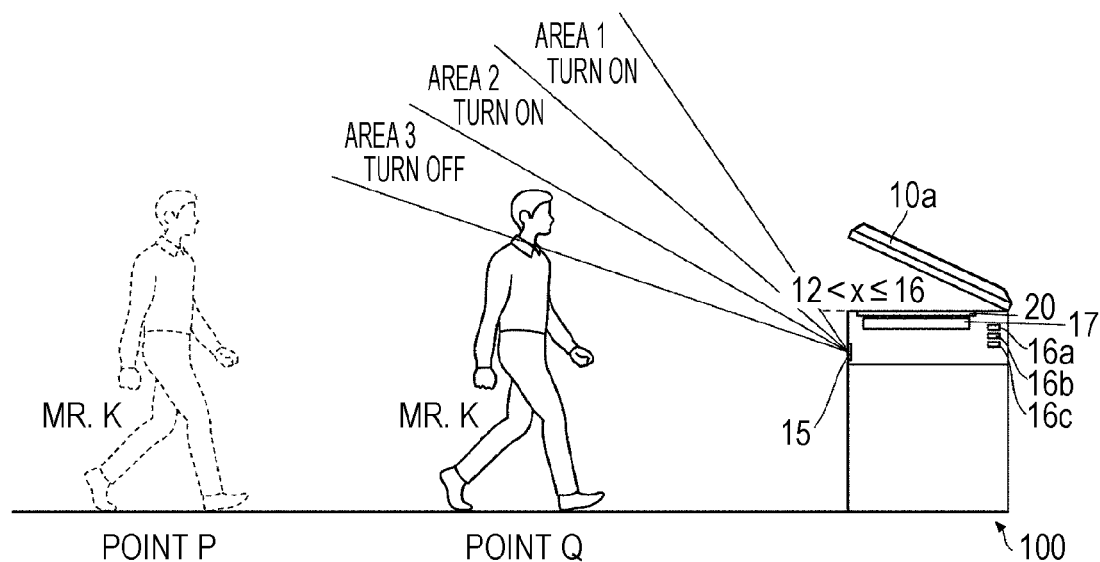
FIGS. 19A and 19B are views illustrating an outline of lamp lighting control in one or more embodiments.
Figure 19B:
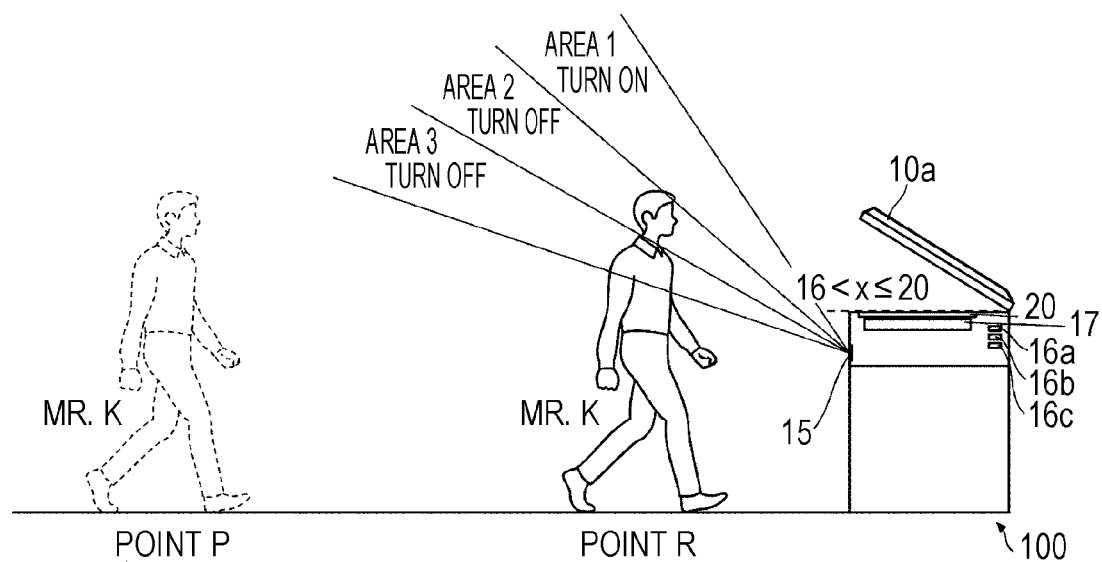

FIGS. 19A and 19B are views illustrating an outline of lamp lighting control in one or more embodiments. FIGS. 19A and 19B illustrate a situation in which Mr. K who is a user is walking toward the image forming apparatus 100. A point P represents a point where the motion detector 15 starts detecting Mr. K, and points Q and R represent a current position of Mr. K. Additionally, "AREA 1", "AREA 2", and "AREA 3" illustrated in FIGS. 19A and 19B are areas in which the motion detector 15 can detect a user's face, and are divided in the height direction. The AREA 1 is an uppermost area closest to the image forming apparatus 100, the AREA 3 is a lowermost area farthest from the image forming apparatus 100, and the AREA 2 is an area between the AREA 1 and AREA 3. Additionally, "TURN ON" illustrated in FIGS. 19A and 19B represents that the lamp 17 is turned on in a case where the user's face is detected in the area, and "TURN OFF" illustrated in FIGS. 19A and 19B represents that the lamp 17 is not turned on even in a case where the user's face is detected in the area. As illustrated in FIG. 19A, when an open angle x of the document pressing cover 10a is larger than 12 degrees and is 16 degrees or less, the lamp 17 is turned on in a case where a Mr. K's face is detected by the motion detector 15 in the AREA 1 or the AREA 2. In FIG. 19A, the lamp 17 is not turned on because the Mr. K' face is currently detected in the AREA 3. In a case where Mr. K approaches the image forming apparatus 100 and Mr. K' face is detected in the AREA 1 or the AREA 2, the lamp 17 is turned on. On the other hand, as illustrated in FIG. 19B, when the open angle x of the document pressing cover 10a is larger than 16 degrees and is 20 degrees or less, in the case where a Mr. K' face is detected by the motion detector 15 in the AREA 1, the lamp 17 is turned on. In FIG. 19B, the lamp 17 is not turned on because the Mr. K's face is currently detected in the AREA 2. In a case where Mr. K approaches the image forming apparatus 100 and Mr. K' face is detected in the AREA 1, the lamp 17 is turned on. Note that an area in which the motion detector 15 can detect the user's face may be any area as far as the distance between the user and the image forming apparatus 100 can be recognized, and the areas are not limited to the three areas of "AREA 1", the "AREA 2", and the "AREA 3".

As illustrated in FIGS. 19A and 19B, in one or more embodiments, in the case where the motion detector 15 detects the user's face, when the open angle of the document pressing cover 10a is large, the lamp 17 is more controlled not to be turned on until the user's face is detected in an area close to the image forming apparatus 100, compared to when the open angle of the document pressing cover 10a is small. Generally, in a case where the document pressing cover 10a is wide open, lamp light easily enters eyes of the user. Therefore, in such a case, the user feels dazzled when the lamp 17 is kept turned on for a long time. However, according to the control like one or more embodiments, in the case where the motion detector 15 detects the user's face, when the open angle of the document pressing cover 10a is large, the lamp 17 can be turned on more delayed than when the open angle of the document pressing cover 10a is small. As a result, in the case where the document pressing cover 10a is wide open, the user is free from feeling dazzled because a situation in which the user receives the lamp light for a long time can be avoided. Additionally, according to such control, even in the case where the document pressing cover 10a is wide open, the lamp 17 is turned on when the user approaches the image forming apparatus 100, and then the initialization processing to return the mode to the normal mode is automatically started. Therefore, it is possible to shorten a user's waiting time caused by returning the mode from the power saving mode to the normal mode.

FIG. 20 is a diagram illustrating a lamp lighting control table 7 according to one or more embodiments. The lamp lighting control table 7 is stored in a ROM 18b. In the lamp lighting control table 7, "ON" or "OFF" of the lamp 17 is allotted in accordance with each open angle of the document pressing cover 10a and each area where a user's face is detected. In a case where a relation between the open angle and the area in which the user's face is detected corresponds to "ON" in the lamp lighting control table 7, the lamp 17 is turned on, and in a case where the relation corresponds to "OFF", the lamp 17 is not turned on. The lamp lighting control illustrated in FIGS. 19A and 19B is achieved by referring to the lamp lighting control table 7 in lamp lighting processing by a CPU 18a (FIG. 21).

In the lamp lighting control table 7, "ON" is allotted in following cases: a case where the open angle is 20 degrees or less in the AREA 1; a case where the open angle is 16 degrees or less in the AREA 2; and the open angle is 12 degrees or less in the AREA 3. With such allotments, in the case where the motion detector 15 detects the user's face, when the open angle of the document pressing cover 10a is large, the lamp 17 is more controller not to be turned on until the user's face is detected in an area close to the image forming apparatus 100, compared to when the open angle of the document pressing cover 10a is small. Generally, in a case where the document pressing cover 10a is wide open, lamp light easily enters eyes of the user. Therefore, in such a case, the user feels dazzled when the lamp 17 is kept turned on for a long time. However, with such allotments, in the case where the motion detector 15 detects the user's face, when the open angle of the document pressing cover 10a is large, the lamp 17 can be turned on more delayed than when the open angle of the document pressing cover 10a is small. As a result, in the case where the document pressing cover 10a is wide open, the user is free from feeling dazzled because the situation in which the user receives the lamp light for a long time can be avoided. Additionally, according to such control, even in the case where the document pressing cover 10a is wide open, the lamp 17 is turned on when the user approaches the image forming apparatus 100, and then the initialization processing to return the mode to the normal mode is automatically started. Therefore, it is possible to shorten the user's waiting time caused by returning the mode from the power saving mode to the normal mode.

Figure 21:
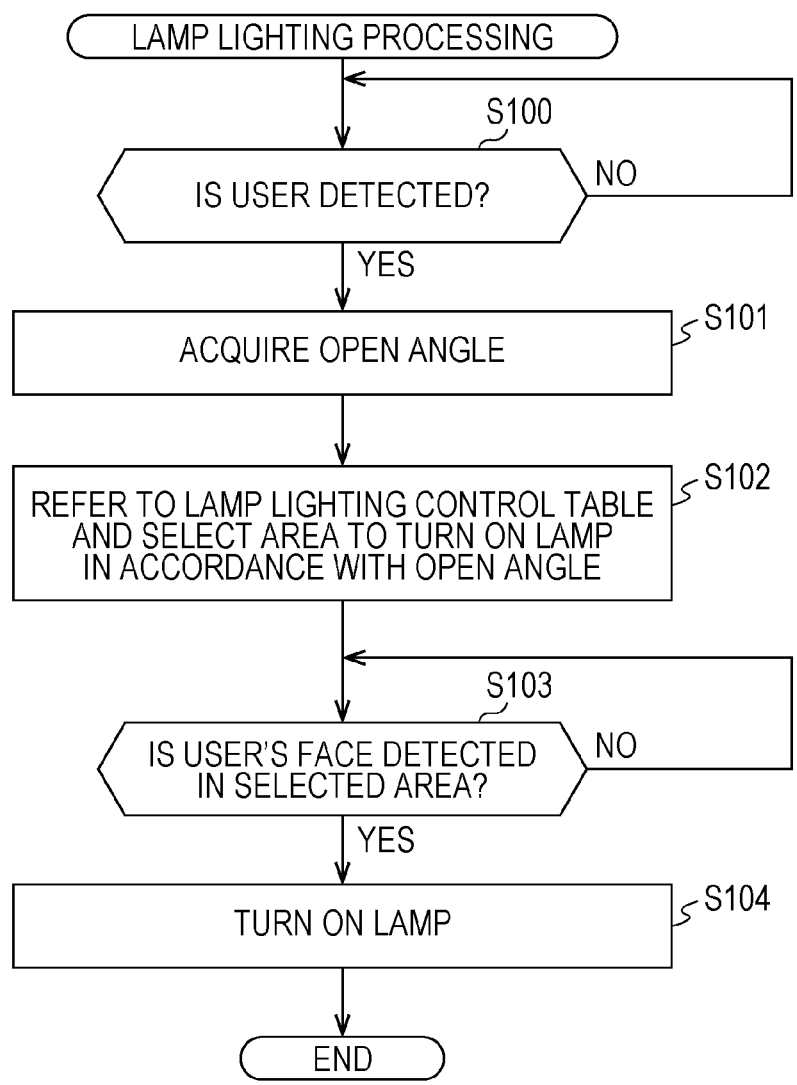
FIG. 21 is a flowchart to describe lamp lighting processing in one or more embodiments.

FIG. 21 is a flowchart to describe the lamp lighting processing in one or more embodiments. The processing illustrated in FIG. 21 is executed by the CPU 18a.

First, the CPU 18a determines whether the motion detector 15 has detected a user (S100). The CPU 18a repeats the determination processing in S100 at a certain time interval until it is determined that the motion detector 15 has detected the user, and in a case of determining that the motion detector 15 has detected the user (YES in S100), the CPU 18a advances the processing to S101. In S101, the CPU 18a acquires the open angle of the document pressing cover 10a detected by open angle sensors 16a, 16b, and 16c. Note that the processing in S100 and S101 is similar to processing in S50 and S51 illustrated in FIG. 4.

Next, the CPU 18a refers to the lamp lighting control table and selects an area to turn on the lamp in accordance with an acquired open angle of the document pressing cover 10a (S102). For example, when the open angle of the document pressing cover 10a acquired in S101 is 15 degrees, the CPU 18a selects the AREA 1 and the AREA 2.

Next, the CPU 18a determines whether the user's face is detected in the selected areas (S103). In the case where the user's face is detected in the selected area (YES in S103), the CPU 18a turns on the lamp 17 (S104) and finishes the processing. On the other hand, in a case where the user's face is not detected in the selected areas (NO in S103), the CPU 18a repeats the processing in S103 until the user's face is detected in the selected areas. For example, in a case where the user's face is not detected in the AREA 1 or the AREA 2 selected in S102, the CPU 18a repeats the determination on whether the user's face is detected in the AREA 1 or the AREA 2 without turning on the lamp 17, and in a case of determining that the user's face is detected in the AREA 1 or the AREA 2, the CPU 18a turns on the lamp 17 and finishes the processing.

With execution of the processing from S100 to S104 by the CPU 18a, it is possible to perform a control as illustrated in FIGS. 19A and 19B to: turn on the lamp 17 when the open angle of the document pressing cover 10a is equal to or less than the angle preset in accordance with the area where the user's face is detected at the time of the motion detector 15 detecting the user; and start the initialization processing to return the mode from the power saving mode to the normal mode.

One or more embodiments described-below differ from the aforementioned embodiments in lighting control for a lamp 17 at the time of a motion detector 15 detecting a user. Certain aspects of one or more embodiments described-below are in common with the aforementioned embodiments, including a configuration of the image forming apparatus 100. In one or more embodiments, the lamp 17 is turned on under a condition that an open angle of a document pressing cover 10a is a predetermined angle or less at the time of the motion detector 15 detecting the user, and then initialization processing to return a mode from a power saving mode to a normal mode is started. On the other hand, in one or more embodiments, the lamp 17 is turned on in a case where the open angle of the document pressing cover 10a is a predetermined angle or less at the time of the motion detector 15 detecting the user or in a case where a document is placed on a document platen 20 even when the open angle exceeds the predetermined angle, and then the initialization processing to return the mode from the power saving mode to the normal mode is started.

Figure 22:
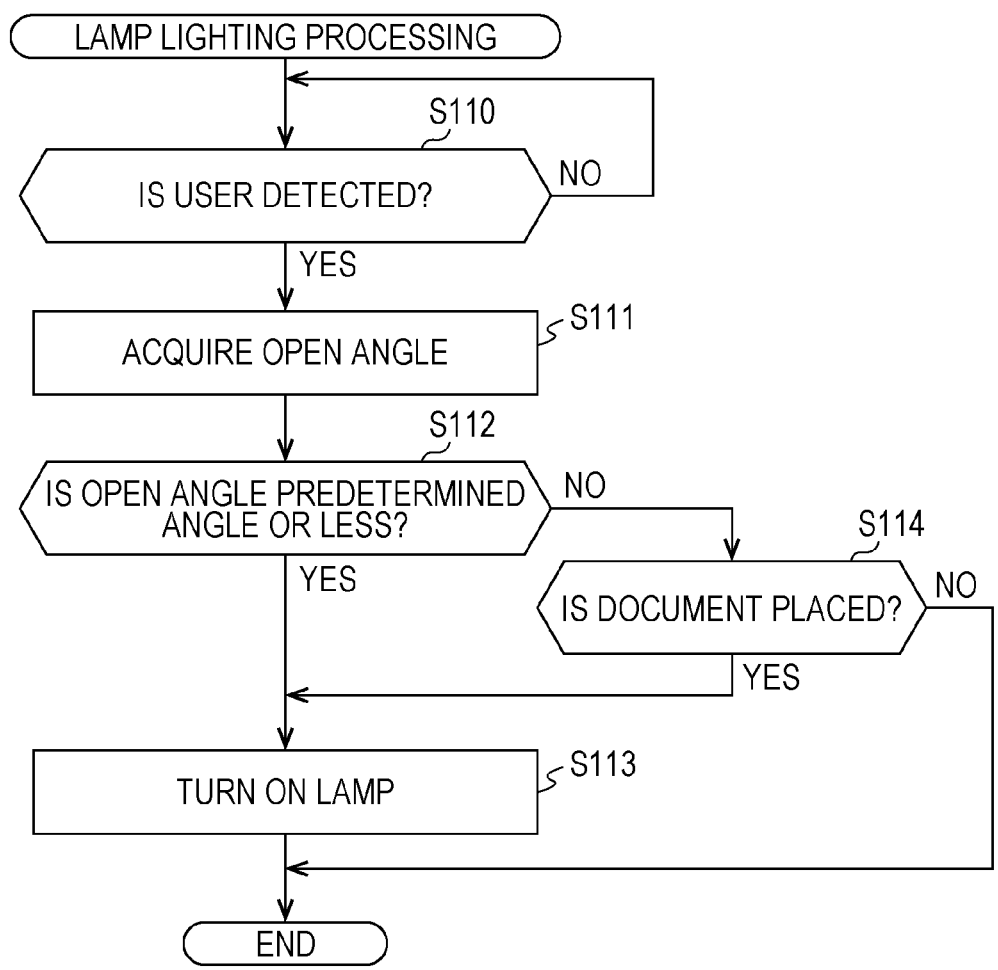
FIG. 22 is a flowchart to describe lamp lighting processing in one or more embodiments.

FIG. 22 is a flowchart to describe the lamp lighting processing in one or more embodiments. The processing illustrated in FIG. 22 is executed by a CPU 18a.

First, the CPU 18a determines whether the motion detector 15 has detected a user (S110). The CPU 18a repeats the determination processing in S110 at a certain time interval until it is determined that the motion detector 15 has detected the user, and in a case of determining that the motion detector 15 has detected the user (YES in S110), the CPU 18a advances the processing to S111. In S111, the CPU 18a acquires the open angle of the document pressing cover 10a detected by open angle sensors 16a, 16b, and 16c. Note that the processing in S110 and S111 is similar to processing in S50 and S51 illustrated in FIG. 4.

Next, the CPU 18a determines whether the acquired open angle of the document pressing cover 10a is the predetermined angle or less (S112). Here, the predetermined angle is a threshold value of the open angle of the document pressing cover 10a used to determine whether to turn on the lamp 17, and may be set to any angle as far as light of the lamp 17 does not directly enter eyes of a user. In a case where the acquired open angle of the document pressing cover 10a is the predetermined angle or less (YES in S112), the CPU 18a turns on the lamp 17 (S113) and finishes the processing. On the other hand, in a case where the acquired open angle of the document pressing cover 10a is not the predetermined angle or less (NO in S112), the CPU 18a shifts the processing to S114.

In S114, the CPU 18a determines whether a document is placed on the document platen 20. In a case where the document is placed (YES in S114), the CPU 18a turns on the lamp 17 (S113) and finishes the processing. On the other hand, in a case where no document is placed (NO in S114), the CPU 18a finishes the processing without turning on the lamp 17.

As illustrated in FIG. 22, in one or more embodiments, the lamp 17 is turned on not only in the case where the open angle of the document pressing cover 10a is the predetermined angle or less at the time of the motion detector 15 detecting the user (YES in S112) but also in the case where the document is placed on the document platen 20 even in a case where the open angle exceeds the predetermined angle (YES in S114), and then the initialization processing to return the mode from the power saving mode to the normal mode is started. Generally, in a case where the document pressing cover 10a is wide open, the lamp light easily enters the eyes of the user. However, according to the control like one or more embodiments, the user is free from feeling dazzled because the lamp light is blocked by the document even though the lamp 17 is turned on in the case where the open angle of the document pressing cover 10a exceeds the predetermined angle at the time of the motion detector 15 detecting the user. Additionally, according to such control, the lamp 17 is turned on in the case where the open angle of the document pressing cover 10a is the predetermined angle or less at the time of the motion detector 15 detecting the user, or in the case where the document is placed on the document platen 20 even when the open angle exceeds the predetermined angle, and then the initialization processing to return the mode to the normal mode is automatically started. Therefore, it is possible to shorten a user's waiting time caused by returning the mode from the power saving mode to the normal mode.

With execution of the processing from S110 to S114 by the CPU 18a, it is possible to perform control to: turn on the lamp 17 in the case where the open angle of the document pressing cover 10a is the predetermined angle or less at the time of the motion detector 15 detecting the user or in the case where a document is placed on the document platen 20 even when the open angle exceeds the predetermined angle; and start the initialization processing to return the mode from the power saving mode to the normal mode.

One or more embodiments described-below differ from the aforementioned embodiments in lighting control for a lamp 17 at the time of a motion detector 15 detecting a user. Certain aspects of one or more embodiments described-below are in common with the aforementioned embodiments, including a configuration of the image forming apparatus 100. In one or more embodiments, the lamp 17 is turned on under a condition that an open angle of a document pressing cover 10a is a predetermined angle or less at the time of the motion detector 15 detecting the user, and then initialization processing to return a mode from a power saving mode to a normal mode is started. On the other hand, in one or more embodiments, it is possible to switch between: a setting in which the lamp 17 is turned on under the condition that the open angle of the document pressing cover 10a is the predetermined angle or less at the time of the motion detector 15 detecting the user; and a setting in which turning on the lamp 17 is prioritized regardless of the open angle of the document pressing cover 10a at the time of the motion detector 15 detecting the user.

Figure 23:
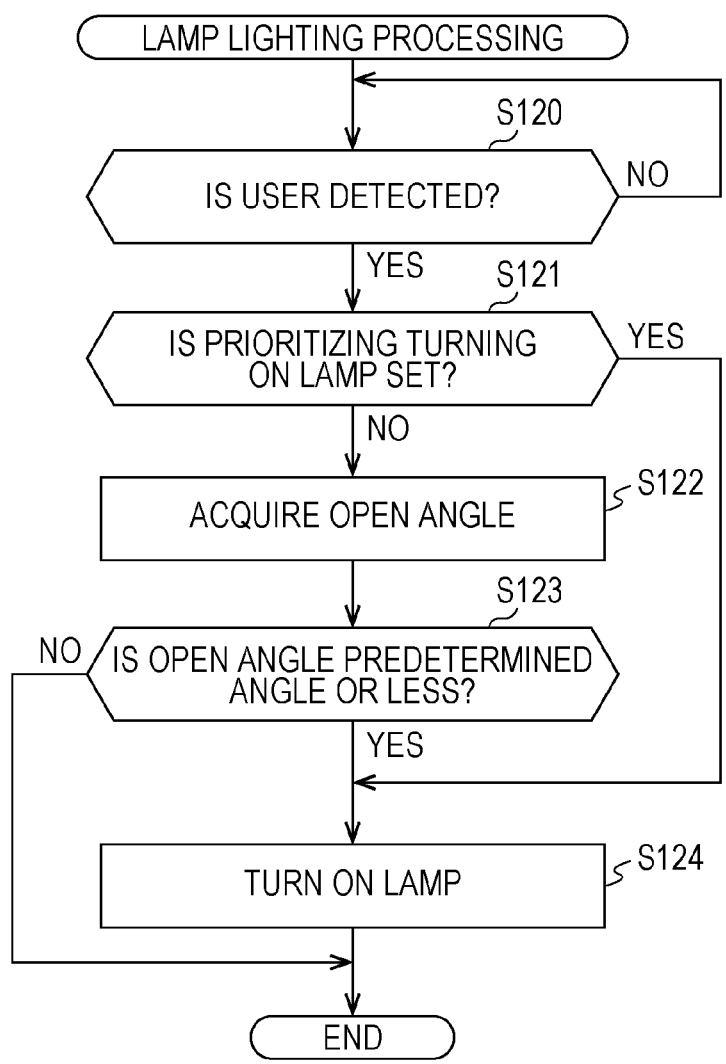
FIG. 23 is a flowchart to describe lamp lighting processing in one or more embodiments.

FIG. 23 is a flowchart to describe the lamp lighting processing in one or more embodiments. The processing illustrated in FIG. 23 is executed by a CPU 18a.

First, the CPU 18a determines whether the motion detector 15 has detected the user (S120). The CPU 18a repeats the determination processing in S120 at a certain time interval until it is determined that the motion detector 15 has detected the user, and in a case of determining that the motion detector 15 has detected the user (YES in S120), the CPU 18a advances the processing to S121. Note that the processing in S120 is similar to processing in S50 illustrated in FIG. 4.

In S121, the CPU 18a determines whether the setting in which turning on the lamp is prioritized is set. The setting in which turning on the lamp is prioritized is set by a user from an operation panel 11a. In a case of determining that the setting in which turning on the lamp is prioritized is set (YES in S121), the CPU 18a turns on the lamp 17 (S124) and finishes the processing. On the other hand, in a case of determining that the setting in which turning on the lamp is prioritized is not set (NO in S121), the CPU 18a acquires the open angle of the document pressing cover 10a. Then, in a case where the open angle of the document pressing cover 10a is the predetermined angle or less, the CPU 18a turns on the lamp 17, and in a case where the open angle of the document pressing cover 10a exceeds the predetermined angle, the CPU 18a finishes the processing without turning on the lamp 17 (S122 to S124). Note that the processing in S122 to S124 is similar to processing in S51 to S53 illustrated in FIG. 4.

As illustrated in FIG. 23, in one or more embodiments, in the case where the setting in which turning on the lamp is prioritized is set (YES in S121), the lamp 17 is turned on regardless of the open angle of the document pressing cover 10a at the time of the motion detector 15 detecting the user, and in the case where the setting in which turning on the lamp is prioritized is not set (NO in S121), the lamp 17 is turned on when the open angle of the document pressing cover 10a is the predetermined angle or less at the time of the motion detector 15 detecting the user, in a manner similar to the aforementioned embodiments. With such control, in a case where a user of the image forming apparatus 100 puts more importance on shortening a user's waiting time caused by returning the mode from the power saving mode to the normal mode, the lamp 17 is turned on regardless of the open angle of the document pressing cover 10a at the time of the motion detector 15 detecting the user, and it is possible to shorten the user's waiting time caused by returning the mode from the power saving mode to the normal mode. On the other hand, in a case where the user of the image forming apparatus 100 puts more importance on avoiding being dazzled by light, the lamp 17 is not turned on in the case where the open angle of the document pressing cover 10a exceeds the predetermined angle at the time of the motion detector 15 detecting the user, and therefore, the user is free from feeling dazzled.

With execution of the processing from S120 to S124 by the CPU 18a, it is possible to perform control to switch between: the setting in which the lamp 17 is turned on under the condition that the open angle of a document pressing cover 10a is the predetermined angle or less at the time of the motion detector 15 detecting the user; and the setting in which turning on the lamp 17 is prioritized regardless of the open angle of the document pressing cover 10a at the time of the motion detector 15 detecting the user.

Note that the above-described embodiments may be arbitrarily combined. Additionally, the values illustrated in the above-described embodiments are merely examples and are not necessarily limited thereto. For example, the open angle of the document pressing cover 10a used to determine whether to turn on the lamp 17 at the time of the motion detector 15 detecting the user is any angle as far as the light of the lamp 17 does not enter the eyes of the user, and the open angle is not limited to the values illustrated in the above-described embodiments. Additionally, "ON" and "OFF" are allotted in units of 4 degrees of the open angle of the document pressing cover 10a and in units of 10 cm of the distance between the user and the image forming apparatus 100, but can be allotted in smaller units or not allotted such. Also, although the height of the image forming apparatus 100 is divided into a case of 95 cm or more and a case of less than 95 cm, however; the height may be divided into smaller units, for example: a case of less than 90 cm; a case of 90 cm or more and less than 95 cm; and a case of 95 cm or more. The similar is applied to the user's standing height. Furthermore, the period from when the motion detector 15 detects a user until the lamp 17 is turned on may be set in accordance with a distance between the user and the image forming apparatus 100 and a walking speed of the user, and is not necessarily limited to the values exemplified in the above-described embodiments. Furthermore, an area in which a user's face is detected may also be any area as far as the distance between the user and the image forming apparatus 100 can be recognized, and is not limited to the three areas.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming apparatus comprising:
   a light source that irradiates a document with light;
   a hardware processor that controls lighting of the light source;
   a cover that is opened and closed with respect to a document platen on which a document is placed; and
   a detector that detects a person, wherein
   when the detector detects a person and when an open angle of the cover is a predetermined angle or less, the hardware processor turns on the light source, and the predetermined angle is based on a height of the image forming apparatus.

2. The image forming apparatus according to claim 1, wherein
   the hardware processor turns on the light source when:
      the detector detects a person;
      the open angle of the cover is the predetermined angle or less; and
      a distance between the detected person and the image forming apparatus is a predetermined distance or less.

3. The image forming apparatus according to claim 2, wherein the predetermined distance is based on a height of the image forming apparatus.

4. The image forming apparatus according to claim 2, wherein the predetermined distance is based on a standing height of a person.

5. The image forming apparatus according to claim 1, wherein when the detector detects a person, the hardware processor turns on the light source after elapse of a predetermined period preset based on the predetermined angle.

6. The image forming apparatus according to claim 1, wherein
   the detector further detects a face of a person in each of a plurality of detection areas divided in a height direction, and
   when the detector detects the face of the person in any one of the detection areas, and when the open angle of the cover is equal to or less than an angle preset based on the one of the detection areas detected by the detector among angles preset based on the respective detection areas, the hardware processor turns on the light source.

7. The image forming apparatus according to claim 1, wherein, even when the open angle of the cover exceeds the predetermined angle, the hardware processor turns on the light source when a document is placed on the document platen.

8. The image forming apparatus according to claim 1, wherein
   the hardware processor switches between a first setting and a second setting,
   the first setting causes the light source to turn on when the detector detects a person and when the open angle of the cover is the predetermined angle or less, and
   the second setting causes the light source to turn on when the detector detects a person regardless of the open angle of the cover.

9. An image forming apparatus comprising:
   a light source that irradiates a document with light;
   a hardware processor that controls lighting of the light source;
   a cover that is opened and closed with respect to a document platen on which a document is placed; and
   a detector that detects a person, wherein
   when the detector detects a person and when an open angle of the cover is a predetermined angle or less, the hardware processor turns on the light source, and
   the predetermined angle is based on a standing height of a person.

* * * * *